United States Patent
Kageyama et al.

(10) Patent No.: US 8,024,340 B2
(45) Date of Patent: Sep. 20, 2011

(54) METADATA COLLECTION SYSTEM, CONTENT MANAGEMENT SERVER, METADATA COLLECTION APPARATUS, METADATA COLLECTION METHOD AND PROGRAM

(75) Inventors: Yuichi Kageyama, Tokyo (JP); Yasuaki Honda, Chiba (JP); Norifumi Kikkawa, Tokyo (JP); Toshiaki Kusakabe, Tokyo (JP); Masahiro Hara, Tokyo (JP); Junichi Nakata, Tokyo (JP); Gen Hamada, Tokyo (JP)

(73) Assignee: Sony Corporation, Tokyo (JP)

( * ) Notice: Subject to any disclaimer, the term of this patent is extended or adjusted under 35 U.S.C. 154(b) by 834 days.

(21) Appl. No.: 12/021,140

(22) Filed: Jan. 28, 2008

(65) Prior Publication Data

US 2008/0183719 A1     Jul. 31, 2008

(30) Foreign Application Priority Data

Jan. 30, 2007   (JP) ............................... P2007-019719

(51) Int. Cl.
  *G06F 17/30* (2006.01)
  *G06F 7/00* (2006.01)
(52) U.S. Cl. ......................... 707/736; 707/758; 707/797
(58) Field of Classification Search .................. 707/620, 707/736, 797, 758
  See application file for complete search history.

(56) References Cited

U.S. PATENT DOCUMENTS

| | | | |
|---|---|---|---|
| 2004/0068521 A1* | 4/2004 | Haacke et al. | 707/200 |
| 2004/0177319 A1* | 9/2004 | Horn | 715/501.1 |
| 2006/0218180 A1* | 9/2006 | Bodlaender et al. | 707/103 R |
| 2007/0088675 A1* | 4/2007 | Duncan | 707/2 |

FOREIGN PATENT DOCUMENTS

JP    2004-234158    8/2004

* cited by examiner

*Primary Examiner* — Tim T Vo
*Assistant Examiner* — Sangwoo Ahn
(74) *Attorney, Agent, or Firm* — Finnegan, Henderson, Farabow, Garrett & Dunner, L.L.P.

(57) ABSTRACT

In a metadata collection system comprising a plurality of content management servers each capable of managing content and content metadata as local content and managing content metadata stored in another content management server as reference content and a metadata collection apparatus connected with the plurality of content management servers to collect metadata from the plurality of content management servers, the metadata collection apparatus collects metadata from the individual content management servers based upon server information held at the content management servers and category identifiers appended to tree structures generated at the content management servers by individually referencing the plurality of content management servers.

17 Claims, 19 Drawing Sheets

FIG.11

| IDENTIFIER | DESCRIPTION |
|---|---|
| av:orgTitle | INDICATES THE ORIGINAL TITLE WHICH DOES NOT INCLUDE THE ITEM REFERENCING SERVER NAME |
| av:orgUuid | INDICATES THE UUID OF THE ITEM REFERENCING SERVER |
| av:orgServerName | INDICATES THE NAME ASSIGNED TO THE ITEM REFERENCING SERVER |
| av:orgMacAddress | INDICATES THE MAC ADDRESS OF THE ITEM REFERENCING SERVER |
| av:orgAlive | INDICATES THE STATUS OF THE ITEM REFERENCING SERVER |
| res@av:orgUuid | INDICATES THE UUID OF THE res REFERENCING SERVER |
| res@av:orgServerName | INDICATES THE NAME ASSIGNED TO THE res REFERENCING SERVER |
| res@av:orgMacAddress | INDICATES THE MAC ADDRESS OF THE res REFERENCING SERVER |
| res@av:orgAlive | INDICATES THE STATUS OF THE res REFERENCING SERVER |

FIG.19

| CONTENT TITLE | MEDIA CLASS | ORIGINAL TITLE | SERVER NAME | UUID | MAC ADDRESS | SERVER STATUS |
|---|---|---|---|---|---|---|
| CHIAKI CANTABILE (LIVING ROOM) | VIDEO | CHIAKI CANTABILE | My BAIO | 060504-052F4F | OOOC6E52D3ED | 1 |
| HYAKU YAKO (BEDROOM) | VIDEO | HYAKU YAKO | My ULTIMATE RECORDER | 060504-053D2A | OOOC7D53F8CE | 0 |

METADATA COLLECTION SYSTEM, CONTENT MANAGEMENT SERVER, METADATA COLLECTION APPARATUS, METADATA COLLECTION METHOD AND PROGRAM

CROSS REFERENCE TO RELATED APPLICATION

The present invention contains subject matter related to Japanese Patent Application JP 2007-19719 filed in the Japan patent office on Jan. 30, 2007, the entire content of which are incorporated herein by reference.

BACKGROUND OF THE INVENTION

1. Field of the Invention

The present invention relates to a metadata collection system, a content management server, a metadata collection apparatus, a metadata collection method and a program.

2. Description of the Related Art

An aspect of the advent of data communication networks in recent years is evident in data exchange among home appliances, computers and other peripheral devices connected through so-called home networks in private homes. The use of a home network, which assures high levels of convenience and comfort to users by allowing various devices to share a data processing function and content to be exchanged among the devices, is expected to become even more prevalent in the future.

The technologies developed to improve the ease of content management by allowing various devices to share content, with identifiers (IDs), each assigned to a specific set of content among a plurality of sets of content that may be exchanged among the devices for identification purposes, which remain unchanged even when the content is transmitted from one device to another, are of particular interest (e.g., see Japanese Patent Application Publication JP-A-2004-234158).

SUMMARY OF THE INVENTION

There are issues to be addressed with regard to the management method disclosed in Japanese Patent Application Publication JP-A-2004-234158 in that since the device that manages the content (hereafter referred to as a server) does not manage the locations of the various sets of content in a systematic manner, metadata related to a specific set of content need to be collected by locating the content through a search executed over the entire server structure and in that the metadata may be collected in duplicate.

Accordingly, the present invention having been completed by addressing the issues discussed above provides a new and improved metadata collection system, a new and improved content management server, a new and improved metadata collection apparatus, a new and improved metadata collection methods and a new and improved program, with which metadata can be collected without duplication from a plurality of servers engaged in content management.

According to an embodiment of the present invention, there is provided a metadata collection system comprising a plurality of content management servers, each capable of managing content and metadata including location information and attribute information related to the content as local content and managing content metadata stored in another content management server as reference content and a metadata collection apparatus that is connected to the plurality of content management servers and collects the metadata from the plurality of content management servers. The content management servers in the metadata collection system each include a storage unit in which server information indicating whether or not the reference content is managed by the content management server as well as local content and/or the reference content is stored, a tree structure generation unit that generates a tree structure constituted with a plurality of hierarchically layered containers, a content allocation unit that allocates the local content and/or the reference content to specific containers in the tree structure based upon the attribute information included in the metadata, an identifier appending unit that appends a category identifier indicating whether or not the local content is allocated to a subject container to each of the plurality of containers based upon the location information included in the metadata related to the local content and/or the reference content allocated to the tree structure, and a content disclosure unit that discloses to the metadata collection apparatus the tree structure with the category identifiers as well as the local content and/or the reference content allocated therein. The metadata collection apparatus in the metadata collection system collects the metadata related to a plurality of sets of content from the individual content management servers based upon the server information held at each content management server and the category identifiers, each indicating whether or not the local content is allocated to the subject container, appended to the plurality of containers constituting the tree structure having been generated by the content management server, by individually referencing the plurality of content management servers to which the metadata collection apparatus is connected.

The metadata include location information, which, in turn, may include content location information indicating the location of the content or thumbnail location information indicating the location of a thumbnail, and attribute information indicating attributes of the subject content such as the content title and the content genre.

According to another embodiment of the present invention, there is provided a content management server capable of communicating with a metadata collection apparatus and a client device, managing content and metadata including location information and attribute information related to the content as local content and managing the content metadata managed by another content management server as reference content, comprising a storage unit in which server information containing an identification flag indicating a category of the content managed by the content management server as well as the local content and/or the reference content is stored, a tree structure generation unit that generates a tree structure constituted with a plurality of hierarchically layered containers, a content allocation unit that allocates the local content and/or the reference content to specific containers in the tree structure based upon the attribute information included in the metadata, an identifier appending unit that appends a category identifier indicating whether or not the local content is allocated to a subject container, to each of the plurality of containers based upon the location information included in the metadata related to the local content and/or the reference content allocated to the tree structure and a content disclosure unit that discloses to the metadata collection apparatus the tree structure with the category identifiers as well as the local content and/or the reference content allocated therein.

Based upon the attribute information included in the content metadata allocated to the individual containers, the identifier appending unit may further append to a given subject container among the plurality of containers a classification identifier indicating a classification of another container or content assuming a lower-order layer relative to the hierarchical layer to which the subject container belongs.

Based upon the classification identifier, the content allocation unit may allocate a single set of content to a plurality of containers in the tree structure.

The number of hierarchical layers constituting the tree structure may be 10 or fewer.

The hierarchical layers in the tree structure may include a hierarchical layer in which a container alone may be set and a hierarchical layer in which both a container and content can be set.

The identifier appending unit may append to a container in a second hierarchical layer in the tree structure an identifier that classifies the content in the container based upon the content type.

The identifier appending unit may append to a container in a third hierarchical layer in the tree structure an identifier classifying the content in the container based upon the attribute information included in the metadata.

According to another embodiment of the present invention, there is provided a metadata collection apparatus capable of communicating with a content management server capable of managing content and metadata including location information and attribute information related to the content as local content and managing the content metadata managed by another content management server as reference content and holds an identification flag indicating a category of the content it manages as server information. The metadata collection apparatus in the metadata collection system includes a metadata collection unit that collects metadata related to a plurality of sets of content from the individual content management servers based upon the server information held at each content management server and category identifiers each indicating whether or not the local content is allocated to the subject container, appended to the plurality of containers constituting the tree structure having been generated by the content management server by individually referencing the plurality of content management servers to which the metadata collection apparatus is connected.

The content category flag may be a flag indicating that the local content alone is managed in the subject content management server, a flag indicating that the reference content alone is managed in the content management server, or a flag indicating that both the local content and the reference content is managed in the subject content management server. The metadata collection unit may collect the metadata from the content management server if the content identification flag either indicates that the local content alone is managed or that both the local content and the reference content are managed.

Only when a given container is appended with the category identifier indicating that the local content is stored therein, the metadata collection unit may reference a lower-order hierarchical layer relative to the hierarchical layer in which the container appended with the category identifier is set.

The metadata collection unit may execute an identicality check on the metadata having been collected from the plurality of content management servers to determine whether or not there are any metadata constituted with identical information.

Each set of metadata may include ID information based upon which the content corresponding to that particular metadata is identified, and the metadata collection unit may execute the identicality check by comparing the ID information included in the metadata it has collected.

The metadata collection unit may execute the identicality check by comparing the location information included in the metadata it has collected.

Each set of metadata may include data size information indicating the data size of the content corresponding to that particular metadata, and the metadata collection unit may execute the identicality check by comparing the data size information included in the metadata it has collected.

The metadata collection apparatus may further include a content list generation unit that generates a content list with content entries each set in correlation to the location information for a specific set of content, based upon a plurality of sets of metadata having been collected from the plurality of content management servers.

The metadata collection apparatus may further include a content list disclosure unit that discloses the content list having been generated to a client device connected to the metadata collection apparatus.

According to another embodiment of the present invention, there is provided a metadata collection method adopted to collect content metadata managed by a plurality of content management servers each capable of managing content and metadata including location information and attribute information corresponding to the content as local content and managing the content metadata managed by another content management server as reference content and holds an identification flag indicating a category of content it manages as server information. The metadata collection method includes a step of collecting the metadata related to a plurality of sets of content from the individual content management servers based upon the server information held at the content management servers and category identifiers, each indicating whether or not the local content is allocated to a subject container, appended to a plurality of containers constituting a tree structure generated by each of the content management servers, by individually referencing the plurality of content management servers.

According to another embodiment of the present invention, there is provided a program enabling a computer that controls a content management server capable of communicating with a metadata collection apparatus and a client device, managing content and metadata including location information and attribute information related to the content as local content and managing the content metadata managed by another content management server as reference content, to assume a storage function of storing server information containing an identification flag indicating a category of the content managed by the content management server as well as the local content and/or the reference content, a tree structure generation function of generating a tree structure constituted with a plurality of hierarchically layered containers, a content allocation function of allocating the local content and/or the reference content to specific containers constituting the tree structure based upon the attribute information included in the metadata, an identifier appending function of appending a category identifier indicating whether or not the local content is allocated to a subject container, to each of the plurality of containers based upon the location information included in the metadata related to the local content and/or the reference content allocated to the tree structure and a content disclosure function of disclosing to the metadata collection apparatus the tree structure allocated with the category identifiers as well as the local content and/or the reference content.

As the computer program stored in a storage unit of the computer is read and executed by the CPU of the computer, the computer is able to function as the content management server described above. The present invention may also be embodied as a computer-readable recording medium having the computer program recorded therein. The recording medium may be a magnetic disk, an optical disk, a magneto-optical disk or a flash memory. Alternatively, the computer program may be distributed via, for instance, a network instead of a recording medium.

According to another embodiment of the present invention, there is provided a program enabling a computer that controls a metadata collection apparatus capable of communicating with a content management server capable of managing content and metadata including location information and attribute information related to the content as local content and managing the content metadata managed by another content management server as reference content and holds an identification flag indicating a category of the content managed therein as server information, to assume a metadata collection function of collecting the metadata related to a plurality of sets of content from individual content management servers based upon the server information held at each content management server and category identifiers each indicating whether or not the local content is allocated to a subject container, appended to a plurality of containers constituting a tree structure generated by each of the content management servers, by individually referencing a plurality of content management servers connected with the metadata collection apparatus.

As the computer program stored in a storage unit of the computer is read and executed by the CPU of the computer, the computer is able to function as the metadata collection apparatus described above. The present invention may also be embodied as a computer-readable recording medium having the computer program recorded therein. The recording medium may be a magnetic disk, an optical disk, a magneto-optical disk or a flash memory. Alternatively, the computer program may be distributed via, for instance, a network instead of a recording medium.

According to the embodiments of the present invention described above, metadata can be collected without duplication from a plurality of servers engaged in content management.

BRIEF DESCRIPTION OF THE DRAWINGS

FIG. 11 shows examples of identifiers that may be appended to reference content in the embodiment;

FIG. 19 shows an example of a content list that may be generated in the embodiment.

DETAILED DESCRIPTION OF THE PREFERRED EMBODIMENTS

Figure 1:
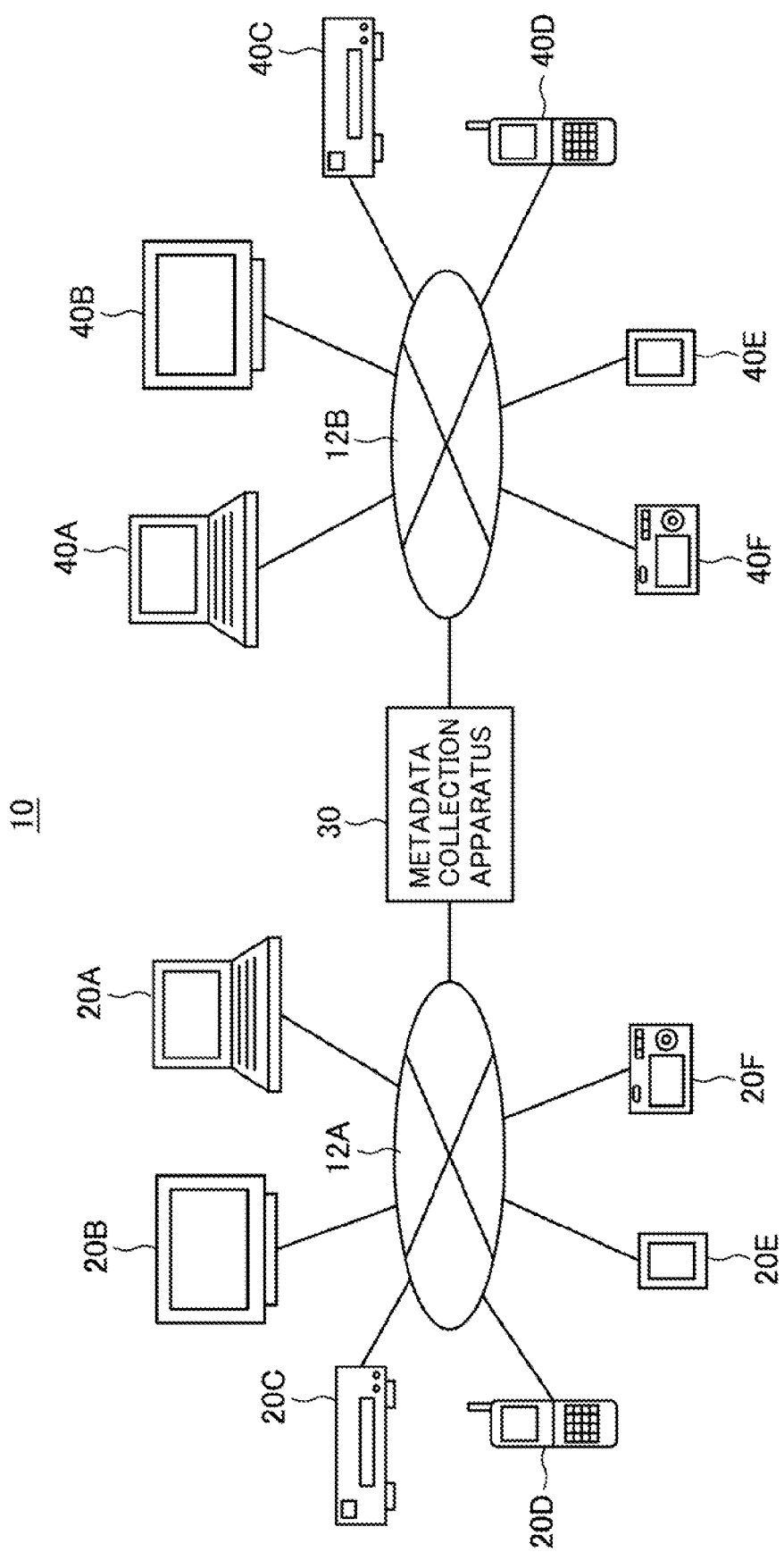
FIG. 1 illustrates the metadata collection system achieved in a preferred embodiment of the present invention.

Hereafter, a preferred embodiment of the present invention will be described in detail with reference to the appended drawings. Note that in this specification and the appended drawings, structural elements that have substantially the same functions and structures are denoted with the same reference numerals and a repeated explanation of these structural elements is omitted.

First Embodiment

The following is a detailed explanation of the content information collection system achieved in the first embodiment of the present invention.

FIG. 1 shows a content information collection system 10 achieved in the embodiment. The content information collection system 10 may include, for instance, communication networks 12A and 12B, content management servers 20A~20F, a metadata collection apparatus 30 and a plurality of client devices 40A~40F.

The communication network 12A connects the content management servers 20 and the metadata collection apparatus 30 so as to enable bidirectional or unidirectional communication between them, whereas the communication network 12B connects the metadata collection apparatus 30 and the client devices 40 so as to allow bidirectional or unidirectional communication between them. These communication networks may each be constituted with, for instance, a public network such as the Internet, a telephone network, a satellite communication network or a broadcast communication channel, or a dedicated network such as a WAN (wide area network), a LAN (local area network), an IP-VPN (Internet protocol-virtual private network), an Ethernet® or a wireless LAN. The communication network may be either wired or wireless.

The content management servers 20 each manage content such as video content, music content and photo content by using a tree structure generated by the content management server 20 in a specific format. The content management server 20 also provides the content managed therein or the content metadata to the metadata collection apparatus 30 or a client device 40 in response to a request issued by the content collection apparatus 30 connected thereto via the communication network 12A or in response to a request issued by the client device 40 connected thereto via the communication network 12A, the content collection apparatus 30 and the communication network 12B. The content management server 20 may be a digital media server (DMS) operating in compliance with the DLNA (digital living network alliance) guidelines. It is to be noted that the content management servers 20 are to be described in detail later.

The metadata collection apparatus 30 collects content metadata managed in the plurality of content management servers 20 from the individual content management servers 20 connected to the metadata collection apparatus 30 via the communication network 12A. The metadata collection apparatus 30 may generate a new content list based upon the content metadata thus collected. In addition, the metadata collection apparatus 30 may be a DMS or a digital media client (DMC) operating in compliance with the DLMA guidelines. It is to be noted that the metadata collection apparatus 30 is to be described in detail later.

The client devices 40 are each connected to the metadata collection apparatus 30 via the communication network 12B and are each capable of issuing a request to the metadata collection apparatus 30 for disclosure of the content list having been generated by the metadata collection apparatus 30. In addition the client devices 40 are each capable of directly obtaining various types of content from the content management servers 20 and reproducing the content having been obtained by bypassing the metadata collection apparatus 30. It is to be noted that a client device 40 may be a DMC operating in compliance with the DLMA guidelines.

It is to be noted that while the content management servers 20 in the example presented in the figure include a computer device 20A such as a personal computer (PC) which may be a notebook-type computer or a desktop computer, a television image receiver 20B, a DVD/HDD recorder 20C, a portable telephone 20D, a PDA (personal digital assistant) unit 20E and a digital camera 20F, the present invention is not limited to these examples and a device such as an information appliance, e.g., a home game console or a digital video camera, or a tuner or a decoder for broadcast television may constitute a content management server, as long as the device has a communication capability for carrying out communication via a network. In addition, a content management server may be a portable device that can be carried by the user, e.g., a portable game machine, a PHS or a portable video/audio player.

In addition, while the client devices 40 in the example presented in the figure include a computer device 40A such as a personal computer (PC) which may be a notebook-type computer or a desktop computer, a television image receiver 40B a DVD/HDD recorder 40C, a portable telephone 40D, a PDA (personal digital assistant) unit 40E and a digital camera 40F, the present invention is not limited to these examples and a device such as an information appliance, e.g., a home game console or a digital video camera, or a tuner or a decoder for broadcast television may constitute a client device 40, as long as the device has a communication capability for carrying out communication via a network. In addition, a client device 40 may be a portable device that can be carried by the user, e.g., a portable game machine, a PHS or a portable video/audio player.

It is to be noted that while the content management servers 20, the metadata collection apparatus 30 and the client device 40 are connected via the communication networks 12, the content management servers 20, the metadata collection apparatus 30 and the client device 40 may be directly connected with one another instead of via the communication networks 12.

Figure 2:
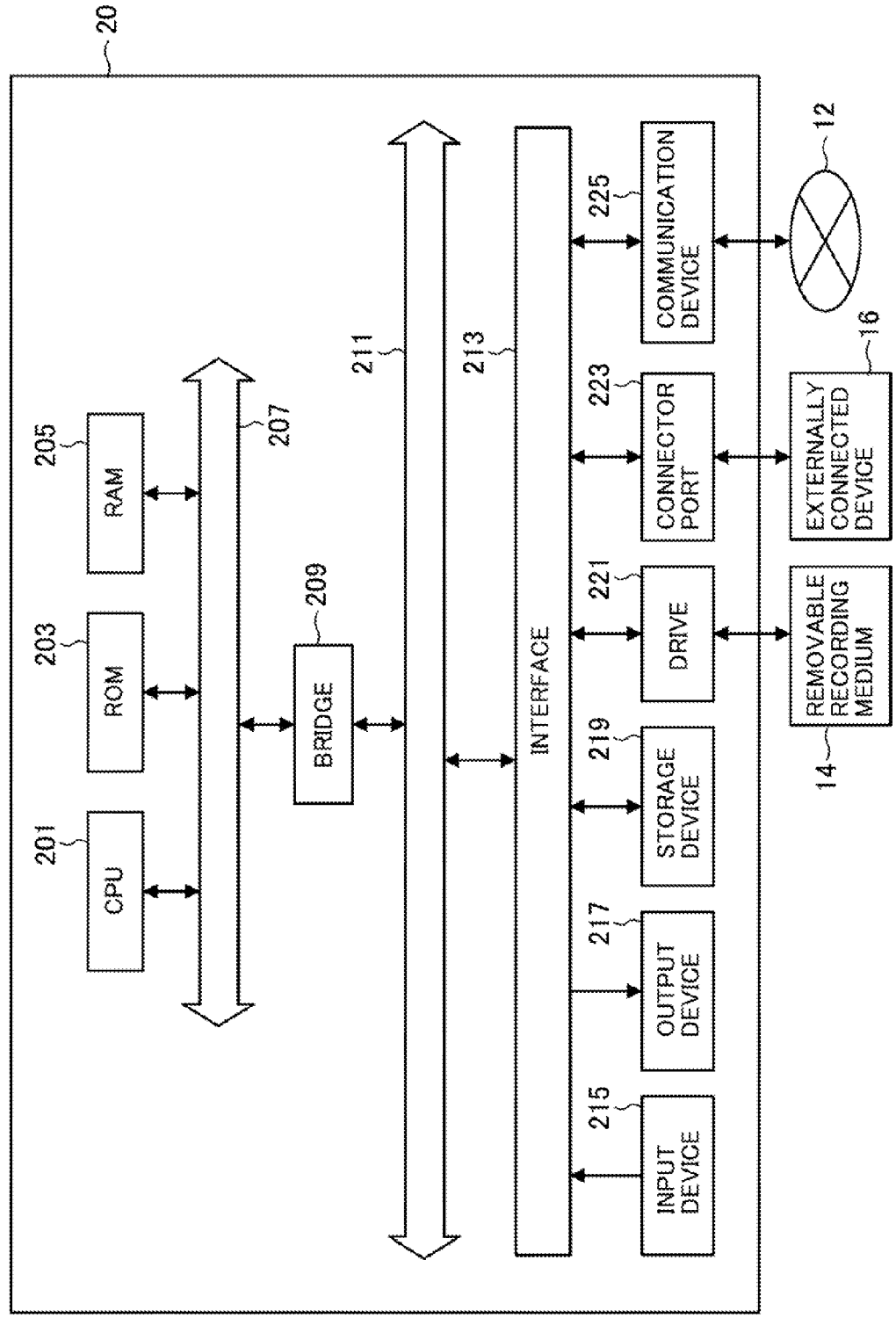
FIG. 2 is a block diagram illustrating the hardware configuration adopted in a content management server in the embodiment.

Next, the hardware configuration that may be adopted in the content management server 20 achieved in the embodiment is briefly explained in reference to FIG. 2.

FIG. 2 shows the hardware configuration of a content management servers 20 in the embodiment. The content management server 20 includes, as its primary components, a CPU (central processing unit) 201, a ROM (read only memory) 203, a RAM (random access memory) 205, a host bus 207, a bridge 209, an external bus 211, an interface 213, an input device 215, an output device to 17, a storage device 219, a drive 221, a connector port 223 and a communication device 225. The CPU 201, which functions as an arithmetic processing device and a control device executes overall control or partial control of the operations of the content management server 20 in conformance to various programs recorded in the ROM 203, the RAM 205, the storage device 219 or a removable recording medium 14. In the ROM 203, the programs, arithmetic operation parameters and the like used by the CPU 202 are stored. In the RAM 205, a program used by the CPU 201 as it executes specific processing, parameters that change during the processing execution and the like are temporarily stored. These components are connected with one another via the host bus 207 constituted with an internal bus such as a CPU bus.

The host bus 207 is connected to the external bus 211, e.g., a PCI (peripheral component interconnect/interface) bus, via the bridge 209.

The input device 215 is an operation means operated by the user, such as a mouse, a keyboard, a touch panel, a button, a switch or a lever. Alternatively, the input device 215 may be a remote-control device (i.e., a remote-control unit) that sends off signals by using infrared or another type of electromagnetic wave. Alternatively, the input device may be constituted with an externally connected device 16 connected to the content management server, such as a portable telephone or a PDA unit, which operates in correspondence to the operation of the content management server 20, or it may be a client device 30. The input device 215 further includes an input control circuit that generates an input signal based upon information entered by the user via, for instance, the operation means and outputs the input signal thus generated to the CPU 201. The user of the content management server 20 operates the input device 215 to input various types of data to the content management server 20 or issue a processing operation instruction to the content management server 20.

The output device 217 includes a display device such as a CRT (cathode ray tube) display device, a liquid crystal display (LCD) device, a plasma display panel (PDP) device, an EL (electro-luminescence) display device or a lamp, an audio output device such as a speaker or a headphone, or a device such as a printer, a portable telephone or facsimile machine, capable of providing the user with information having been obtained in a visual or audio format. Reproduced content data, for instance, are output via the output device 217. More specifically, various types of information such as reproduced video image data are displayed in a text format or as images at the display device. The audio output device provides reproduced audio data or the like converted to an audio output.

The storage device 219 is a data storage device representing an example of the storage unit in the content management server 20 achieved in the embodiment. The storage device 219 may be constituted with a magnetic storage device such as an HDD (hard disk drive), a semiconductor storage device, an optical storage device or a magneto-optical storage device. In the storage device 219, programs to be executed by the CPU 201, various types of data, content, content information needed in content execution, content metadata, content data obtained from an external source and the like are stored.

The drive 221, which functions as a storage medium reader/writer, is provided as a built-in unit in the content management server 20 or as an externally mounted unit. The drive 221 read out information recorded in the removable storage medium such as a magnetic disk, an optical disk, a magneto-optical disk or a a semiconductor memory loaded therein and outputs the information thus read out to the RAM 205. In addition, the drive 221 is capable of writing data into a removable recording medium 14 loaded therein, such as a magnetic disk, an optical disk, a magneto-optical disk or a semiconductor memory. The removable recording medium 14 may be, for instance, a DVD medium, an HD-DVD medium, a Blu-Ray medium, a CompactFlash (CF), a memory stick or an SD memory (secure digital memory) card. Alternatively, the removable recording medium 14 may be an IC (integrated circuit) card or an electronic device equipped with a noncontact-type IC chip.

Via the connector port 223, which may be a USB (universal serial bus) port, an IEEE 1394 port such as an i-Link, a SCSI (small computer system interface) port, an RS-232C port or an optical/audio terminal, a device is directly connected to the content management server 20. With the external device 16 connected to the connector port 223, the content management server 20 is able to directly obtain content data from the external device 16 or provide content data to an external device 16.

The communication device 225 is a communication interface constituted with, for instance, a communication device through which connection with the communication networks 12 is established. The communication device 225 may be a communication card for wired or wireless LAN (local area network) communication, Bluetooth communication or WUSB (wireless USB) communication, a router for optical communication, a router for an ADSL (asymmetric digital subscriber line) or a modem used for various types of communication. The communication device 225 is capable of exchanging content or information related to content with the client devices 30 and also is capable of exchanging content or content metadata with the Internet or another communication device. In addition, the communication networks 12 connected to the communication device 225 is constituted with a network connected through wired or wireless connection, which may be, for instance, the Internet, a private home LAN, an infrared communication network or a satellite communication network.

The content management server 20 adopting the structure described above is able to obtain content and content-related information from diverse information sources and transmit content and content-related information to the metadata collection apparatus 30 or a client devices 40 connected thereto via the communication networks 12. It is also able to receive content metadata and execution-related information from the metadata collection apparatus 30 or the client device 40 and obtain content or content-related information held in the metadata collection apparatus 30 and the client device 40. In addition, the content management server 20 is able to transfer content and content-related information via the removable recording medium 14. By using such content management servers 20, the metadata collection apparatus 30 and the client devices 40, an ideal digital home network is configured.

It is to be noted that as the metadata collection apparatus 30 and the client devices 40 each adopt a hardware configuration substantially identical to the hardware configuration of the content management servers 20, an explanation of the hardware configuration of the metadata collection apparatus and the client devices is omitted.

The various structural elements in the example of the hardware configuration explained above that may be adopted to fulfill the functions of the content management servers 20, the metadata collection apparatus 30 and the client devices 40 in the embodiment may each be constituted with a universal member or may be constituted with a hardware unit customized to fulfill the function of the particular structural element. In other words, the actual hardware configuration can be adjusted to suit the level of technologies adopted when the embodiment is implemented. In addition, it will be obvious that the hardware configuration described above simply represents an example and the present invention is not limited to this example. Furthermore, in certain modes of utilization, the host bus 208, the external bus 211, the interface 213, or the like may be omitted.

Next, some of the terms used in the description of the metadata collection system 10 achieved in the embodiment are briefly explained.

The content managed at the content management servers 20 includes, for instance, image data such as still images and dynamic images, audio data such as music and data transmitted from a tuner for live streaming and the various types of content are collectively referred to as AV content.

The AV content can be sorted into classifications each matching a specific AV content data format, e.g., still image data, dynamic image data or music data. For instance, if a specific set of AV content is provided in the JPEG data format, this set of AV content can be judged to be still image data (photographic data). If, on the other hand, the set of AV content is provided in the LPCM format, the AAC format, the ATRAC3 plus format, the MP3 format, the WMA9 format or the like, the AV content can be judged to be music data. If the set of AV content is provided in the MPEG2 format, the MPEG4:2 format, the MPEG4:10 format, the WMV9 format or the like, the AV content can be judged to be dynamic image data (video data).

In the following description, each set of AV content or a folder having stored therein a plurality of sets of AV content is referred to as an object. It is to be noted that the term "object" is used to summarily refer to the data unit in correspondence to which data are processed by the content management servers 20, and there may be various objects other than individual sets of AV content and folders each having stored therein a plurality of sets of AV content. An object may be any type of content carrying image (video) content constituted with a movie, a television program, a video program or a dynamic or still image such as graphics, audio content such as music, a lecture or a radio program, game content, document content or a software program. Video content may include audio data in addition to the video data.

In addition, the minimum unit of AV content, e.g., a set of music data, a set of dynamic image data or a set of still image data, is referred to as an item. Live streaming data for a single channel are handled as an item.

A higher-order object assuming a higher-order relative to the items, which is defined as an aggregation of items, is referred to as a container. Items may be aggregated in various units, e.g., they may be aggregated based upon the physical storage positions of the individual objects, based upon the logical relationships among the individual objects or based upon their categories. This container is to be described in detail later.

In addition, when the content data and the metadata corresponding to specific content are both managed in a given content management server 20, the content is referred to as local content in the following description. In addition, content managed by another content management server, the metadata corresponding to which alone are managed by the content management server 20 by referencing the other content management server 20, are referred to as reference content.

(Content Management Servers 20)

Figure 3:
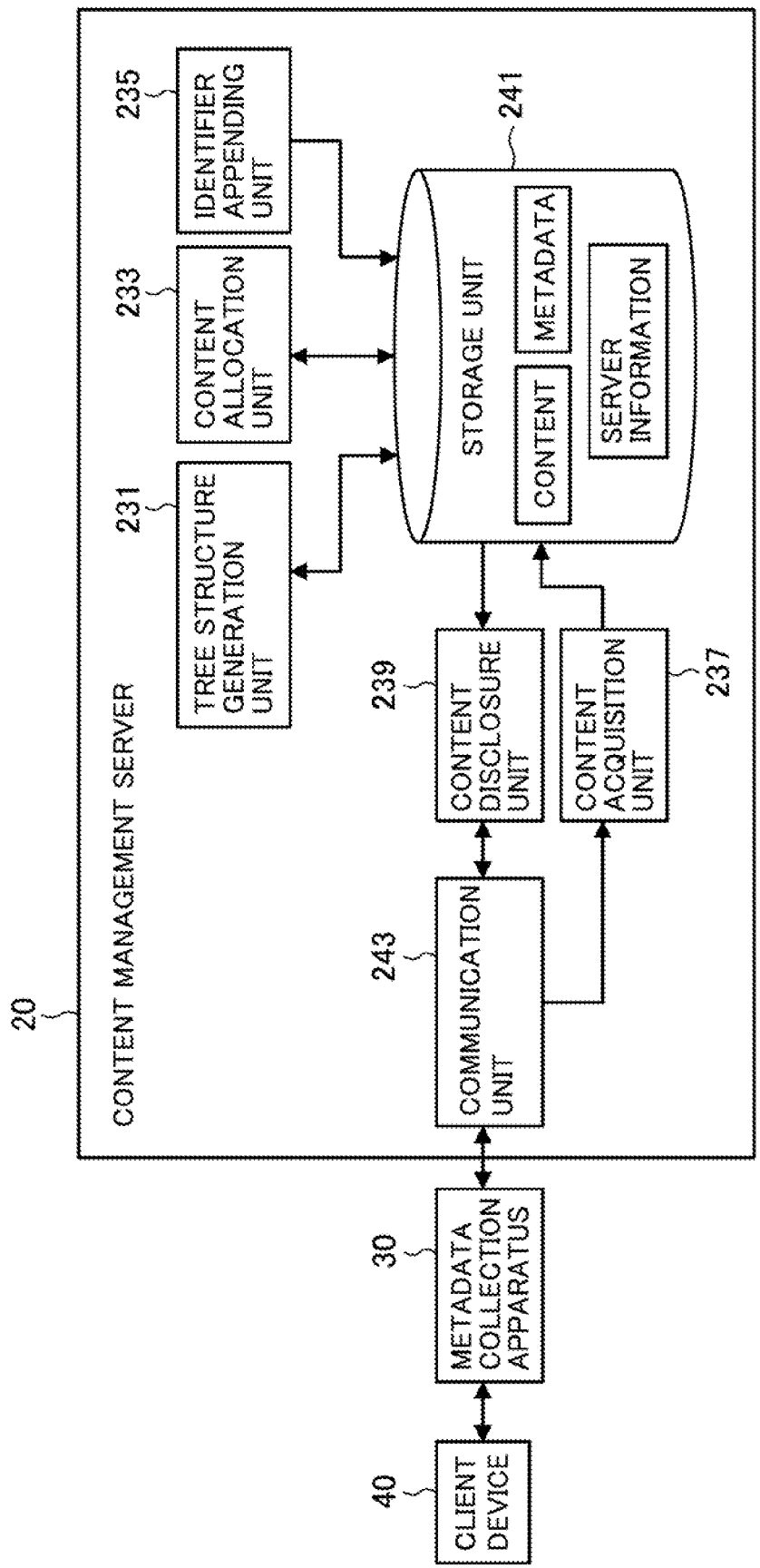
FIG. 3 is a block diagram illustrating the structure of the content management server achieved in the embodiment.

Next, the structure of the content management servers 20 achieved in the embodiment is explained in reference to FIG. 3. FIG. 3 is a block diagram showing the structure adopted in the content management servers 20 in the embodiment.

As shown in FIG. 3, the content management servers 20 in the embodiment may each include a tree structure generation unit 231, the content allocation unit 233, an identifier appending unit 235, a content acquisition unit 237, a content disclosure unit 239, a storage unit 241 and a communication unit 243.

The tree structure generation unit 231 generates a tree structure constituted with a plurality of hierarchically layered containers. In the tree structure generated by the tree structure generation unit 231, a "ROOT" container is set in a first hierarchical layer and a plurality of containers are set in hierarchical layers subordinate to the first hierarchical layer. If the number of hierarchical layers in the tree structure exceeds 10, it will take a significant length of time for the metadata collection apparatus 30 or the client devices 40 to execute a search through the tree structure by accessing the content management server 20 to obtain information located at an extreme end of the tree structure, which compromises the operational efficiency with which the user of the metadata collection apparatus 30 or the client devices 40 operates the devices. For this reason, it is more desirable to limit the number of hierarchical layers in the tree structure to 10 or fewer.

When a branch extends downward from a given container with another container set at the tip of the branch, the upper container is referred to as a superior container and the lower container is referred to as a subordinate container in the description. The role assumed by a given container, i.e., either the superior container or the subordinate container, is entirely relative. For instance, when there are three containers connected along the top to bottom direction through a single branch, the container assuming the middle position is subordinate to the uppermost container and superior to the lowermost container.

The tree structure generation unit 231 may store information related to the tree structure it has generated into the storage unit 241 to be detailed later.

The content allocation unit 233 allocates local content stored in the storage unit 241 at the content management server 20 to the tree structure having been generated by the tree structure generation unit 231 based upon content attribute information included in the metadata related to the local content. In addition, the content allocation unit 233 is able to allocate reference content managed by another content management server to the tree structure having been generated by the tree structure generation unit 231. The content allocation unit 233 allocates the reference content based upon the attribute information included in the reference content metadata, which are stored in the storage unit 241.

Also, the content allocation unit 233, having allocated all the content managed in the storage unit 241 to the tree structure having been generated by the tree structure generation unit 231, adds an identification flag indicating the categories of the content managed by the content management server into the server information at the management server. The flag indicating the categories of the content managed by the content management server is one of the following four flags. In addition, the server information with the flag having been added thereto is stored into the storage unit 241.
(i) a flag indicating that only local content is managed
(ii) a flag indicating that only reference content is managed
(iii) a flag indicating that both local content and reference content are managed
(iv) a flag indicating that neither local content nor reference content is managed More specifically, the flag may be, for instance, a "av: aggregation Flags" flag constituted with a parameter "lc-val" used to define the presence/absence of local content and a parameter "ag-val" used to define the presence/absence of reference content. The parameter "lc-val" assuming the value "1" indicates that the content management server 20 may be managing local content, whereas the parameter "lc-val" assuming a value "0" indicates that the content management server 20 is not currently managing local content. Likewise, the parameter "ag-val" assuming the value "1" indicates that the content management server 20 may be managing reference content, whereas the parameter "ag-val" assuming a value "0" indicates that the content management server 20 is not currently managing reference content. Accordingly, through a specific combination of these two parameters, one of the four patterns (i)~(iv) can be represented. This flag is stored as a type of information indicating service content inherent to the device, which is referred to as device description of the content management server 20, into the storage unit 241 together with the server information.

It is to be noted that the term "server information" is used to refer to the entire information used to uniquely identify the content management server and thus, no two content management servers 20 hold identical server information. For instance, such server information may include the server name assigned to the subject content management server 20, the IP address of the content management server, the UUID of the content management server or the MAC address of the content management server. In addition, the server information may include server status information indicating whether or not the power to the content management server holding the server information has been turned on.

It is to be noted that the content allocation unit 233 may store location information or the like related to content having been allocated to the tree structure into the storage unit 241.

Based upon the location information included in the metadata related to the local content and/or the reference content having been allocated to the tree structure, the identifier appending unit 235 appends a category identifier to each of the containers constituting the tree structure. This category identifier indicates whether or not local content is allocated to the container appended with this identifier and lower-order containers relative to the container appended with the identifier. This category identifier may assume a format such as "av:noLocalConents". The "av:noLocalConents" assuming the value "3" indicates that no local content is allocated to the container appended with the identifier or any lower-order container relative to the container appended with the identifier. The "av:noLocalConents" assuming the value "0" indicates that local content is allocated to the container appended with the identifier and lower-order containers relative to the container appended with the identifier.

In addition, an identifier indicating a specific format in which the tree structure having been generated by the tree structure generation unit 231 has been generated is appended to the containers constituting the tree structure. This identifier is an index that indicates that the tree structure having been generated by the tree structure generation unit 230 has been generated in a predetermined specific format. A specific example of this identifier is a classification identifier indicating a content classification. The metadata collection apparatus 30 or a client device 40 having accessed the content management server 20 references the classification identifier to ascertain the lower-order containers and the content branching from the container appended with the identifier. As a result, the metadata collection apparatus or the client device is able to obtain desired content or desired content-related metadata without having to search the entire tree structure.

The content-related metadata include attribute information related to the details of the particular content and location information indicating the location of the content. The attribute information related to the specific details of the content may be various types of information such as content resource information, information indicating the content title or the artist name and copyright information. In addition, the location information indicating the content location may be, for instance, the ID used for content management, the URI (uniform resource identifier) of the content or the like.

The identifier described above may be an identifier indicating the classification of another container allocated in a hierarchical layer lower than the hierarchical layer to which the container with the identifier appended thereto belongs or the classification of the content allocated to a lower hierarchical layer. In this case, it is guaranteed that containers with the classification indicated by the identifier appended to the target container, i.e., the superior container, alone is set as subordinate containers or inferior subordinate containers or that content with the classification indicated in the identifier appended to the superior container alone is allocated to subordinate containers and inferior subordinate containers. The term "classification" as used in this description refers to a classification into which a given set of content is sorted based upon the content type (expression medium type) such as video content, music content or photo content, content attribute information (indicating a specific genre, artist, album) or the like.

It is to be noted that once the tree structure is generated by the tree structure generation unit 231, the identifier appending unit 235 may append the classification identifiers to the containers before the content allocation unit 233 allocates content to the containers. In addition, when allocating content to the tree structure, the content allocation unit 233 may allocate a set of content to a plurality of containers based upon the classification identifiers appended to the containers. By setting a set of content in correspondence to a plurality of containers appended with different identifiers as described above, the content management server 20 enables the metadata collection apparatus 30 or the client device 40 having accessed the content management server to search for desired content with a high level of efficiency based upon the identifiers appended to the containers.

It is to be noted that the identifier appending unit 235 may store into the storage unit 245, the tree structure having been generated by the tree structure generation unit 231 and the identifiers appended thereto in correlation to each other.

The content acquisition unit 237 obtains new content from a source outside the content management server 20. The content acquisition unit 237 may obtain content from a medium such as a CD (compact disc), a DVD (digital versatile disc) or a memory card or from a network. In addition, it may have a function of obtaining content by recording a television program, a lecture or a radio program.

The content acquisition unit 237 may store the content it has obtained via various means as described above into the storage unit 241.

In response to a request from the metadata collection apparatus 30 or a client device 40 connected to the content management server 20, the content disclosure unit 239 discloses the tree structure, the content and the metadata set in correspondence to the tree structure or the like to the metadata collection apparatus 30 or the client device 40. The content disclosure unit 230 may disclose the tree structure, the content, the metadata or the like by referencing the content data or the metadata stored in the storage unit 241.

In the storage unit 241, content data corresponding to the local content managed by the content management server 20, the content metadata and the like are stored. The content metadata managed by content management server 20 as reference content can also be stored in the storage unit. Furthermore, the server information including the identification flag indicating the categories of the content managed by the content management server 20 is also stored in the storage unit 241.

In addition to the data listed above, the tree structure generated by the tree structure generation unit 231, data indicating the correspondence between the tree structure and the content allocated thereto by the content allocation unit 233 and the like may be stored in the storage unit 241. Moreover, various parameters that need to be saved while the content management server 20 executes a specific type of processing, a processing interim status and the like can be stored as necessary into the storage unit as well as the content-related data. The tree structure generation unit 231, the content allocation unit 233, the identifier appending unit 235, the content acquisition unit 237, the content disclosure unit 239 and the like can read data from or write data into the storage unit 241 freely.

The communication unit 243 transmits various types of information, which the content disclosure unit 239 is disclosing to the metadata collection apparatus 30 or the client device 40, via the communication networks 12. In addition, the communication unit 243 of the content management server 20 is capable of receiving a request or the like issued from the metadata collection apparatus 30 or the client device 40 as well. Furthermore, the communication unit 243 is able to exchange information with a metadata collection apparatus 30 or a client device 40 that is directly connected to the content management server 20 by bypassing the communication networks 12.

(Operation of the Content Management Server 20)

As a content management server 20 in the metadata collection system 10 configured as described above is initially started up, the tree structure generation unit 231 of the content management server 20 generates a tree structure in a specific format and then stores the tree structure into the storage unit 241. At this time, the identifier appending unit 235 may append specific classification identifiers to containers included in the tree structure having been generated.

Then, the content allocation unit 233 sets content having been input to the content management server 20 via various means in correspondence to optimal positions in the tree structure based upon the content attribute information, the identifiers appended to the tree structure or the like. The results achieved by the content allocation unit 233 by setting the content in correspondence to the specific positions in the tree structure are stored into the storage unit 241.

In addition, upon obtaining new content from a source outside the content management server 20, the content acquisition unit 237 saves the acquired content into the storage unit 241. Subsequently, the content allocation unit 233 sets the content having been newly acquired by the content acquisition unit 237 in correspondence to a specific position in the tree structure in much the same way as that described above.

Once the content allocation to the tree structure having been generated is completed, the content allocation unit 233 adds the identification flag indicating the categories of the content managed by the content management server into the server information. In addition, based upon the location information included in the metadata related to the allocated content, the identifier appending unit 235 appends category identifiers.

It is to be noted that the tree structure may be generated by the tree structure generation unit 230 only when the content management server 20 is initially started up or a tree structure may be generated on a regular basis over specific time intervals. In addition, a tree structure may be generated subsequently at any time in response to an instruction from the owner of the content management server 20. Content may be set in correspondence to specific positions in the tree structure by the content allocation unit 233 at any time in response to a re-execute instruction issued by the owner of the content management server 20 or content reallocation may be executed at the content management server 20 on a regular basis over specific time intervals as well as when new content is taken into the content management server.

As a content list disclosure request is transmitted to the content management server 20 from the metadata collection apparatus 30 or the client device 40 connected to the content management server 20 via the networks 12 or connected directly to the content management server 20, the communication unit 243 of the content management server 20 receives the request originating from the metadata collection apparatus 30 or the client device 40 and transmits the details of the request to the content disclosure unit 239. The content disclosure unit 239, in turn, references the data stored in the storage unit 241 and transmits information related to the tree structure and the metadata to the communication unit 243 in preparation for execution of the processing for disclosing the tree structure and the content metadata to the metadata collection apparatus 30 or the client device 40. Upon receiving the information related to the tree structure and the metadata, the communication unit 243 transmits the tree structure information and the metadata to the metadata collection apparatus 30 or the client device 40, thereby disclosing the tree structure and the metadata.

In addition, upon receiving a content acquisition request originating from a client device 40, the communication unit 243 transmits the details of the request to the content disclosure unit 239. The content disclosure unit 239, in turn, obtains the corresponding content data from the storage unit 241 and transmits the content data to the client device 40 via the communication unit 243.

(Metadata Collection Apparatus 30)

Figure 4:
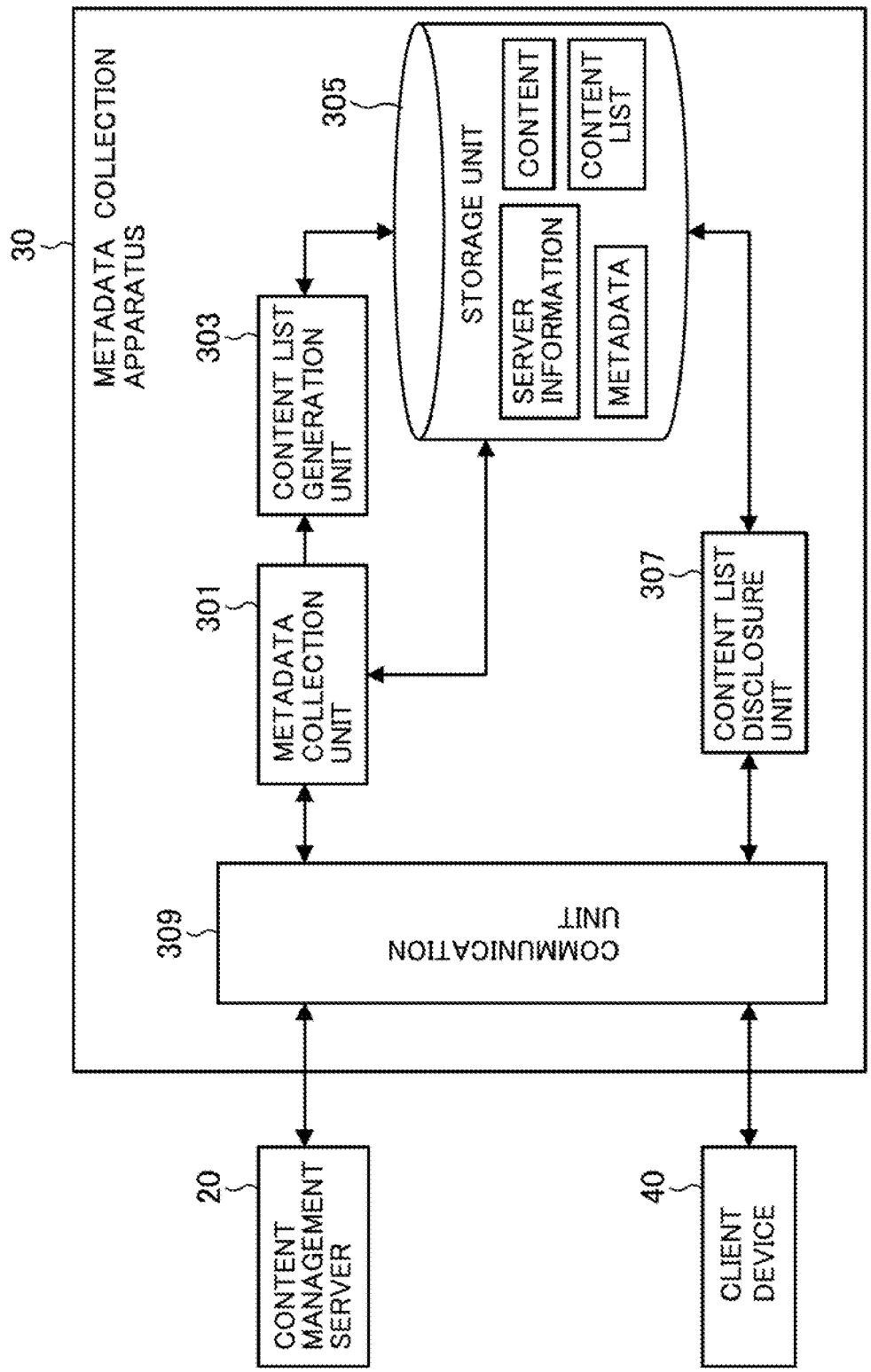
FIG. 4 is a block diagram illustrating the structure of the metadata collection apparatus achieved in the embodiment.

Now, in reference to FIG. 4, the structure adopted in the metadata collection apparatus 30 in the embodiment is explained in detail. FIG. 4 is a block diagram showing the structure of the metadata collection apparatus 30 achieved in the embodiment.

As shown in FIG. 4, the metadata collection apparatus 30 achieved in the embodiment may include, for instance, a metadata collection unit 301, a content list generation unit 303, a storage unit 305, a content list disclosure unit 307 and a communication unit 309.

The metadata collection unit 301 individually references the plurality of content management servers 20 connected thereto via the networks 12 and collects metadata related to a plurality of sets of content from the various content management servers 20 based upon the server information held at the individual content management servers 20 and the category identifiers appended to the plurality of containers constituting the individual tree structures generated by the content management servers 20. The server information held at each content management server 20 includes the identification flag indicating the categories of content managed by the particular content management server 20 and thus, by referencing these identification flags, each content management server 20 to be referenced can be selected. In addition, after selecting the content management server 20 to be referenced by referencing the identification flags in the server information, a container, the containers set in lower-order hierarchical layers relative to which need to be searched, can be distinguished from a container, the containers set in lower-order hierarchical layers relative to which do not need to be searched, by referencing the category identifiers appended to the containers. Thus, by referencing the server information and the category identifiers, metadata can be collected with a high level of efficiency.

As explained earlier, the flag added into the server information held in each content management server 20 is one of the following four flags.

(i) a flag indicating that only local content is managed
(ii) a flag indicating that only reference content is managed
(iii) a flag indicating that both local content and reference content are managed,
(iv) a flag indicating that neither local content nor reference content is managed The metadata collection apparatus 30 collects metadata only from content management servers 20 each holding an identification flag (i) or (iii).

In addition, the category identifiers appended to the containers constituting the tree structure, each indicating whether or not local content is allocated to the container with the identifier appended thereto and lower-order containers, can be used when referencing a content management server 20 holding an identification flag (i) or (iii). For instance, if the "av:noLocalConents" identifier is appended to a given container, no containers set in lower-order hierarchical layers relative to this container need to be searched.

If content with a specific classification, e.g., video content or music content, is to be collected, efficient metadata collection can be assured by referencing the classification identifiers as well as the server information and the category identifiers.

In addition, the metadata collection unit 301 executes an identicality check on the metadata having been collected as described above so as to determine if identical metadata have been collected in duplicate. The identicality check may be executed by comparing the content ID information, content location information indicating the content URI, the content data size information or the like included in the collected metadata. Alternatively, the identicality check may be executed by actually reading the beginning of each set of content data, e.g., by reading the content data over the first several hundred bytes.

It is to be noted that the metadata collection unit 301 may store the metadata, the server information and the like it has collected into the storage unit 305 to be detailed later. In addition, the metadata collection unit 301 may obtain the actual content data in addition to the content metadata from the content management server 20.

The content list generation unit 303 gathers numerous sets of metadata having been collected from the plurality of content management servers 20 and creates a new content list based upon the metadata having been collected by the metadata collection unit 301. This content list lists all the sets of content managed by the plurality of content management servers 20 connected with the metadata collection apparatus 30 without duplication. The content list generation unit 303 generates the content list by setting the content titles or the like in correlation to the corresponding location information included in the metadata. In addition, the content list generation unit 303 may store the content list it has generated into the storage unit 305.

Metadata, server information, content and the like having been collected from the content management servers 20 are stored into the storage unit 305. Content data having been obtained from content management servers 20, too, may be stored into the storage unit 305. The content list having been generated by the content list generation unit 303 may also be stored in the storage unit 305.

Moreover, various parameters that need to be saved while the metadata collection apparatus 30 executes a specific type of processing, a processing interim status and the like can be stored as necessary into the storage unit as well as the data listed above. The metadata collection unit 301, the content list generation unit 303, the content list disclosure unit 307 and the like can read data from and write data into the storage unit 305 freely.

The content list disclosure unit 307 discloses to a client device 40 connected to the metadata collection apparatus 30 the content list having been generated by the content list generation unit 303 in response to a request issued by the client device 40. Since the location information indicating the locations of the content is stored in correlation to the content in the content list, the client device 40 is able to efficiently select a target content management server 20 when it selects desired content from the content list.

The communication unit 309 transmits various types of information, which the content list disclosure unit 307 is disclosing to the client device 40 via the communication networks 12. In addition, the communication unit 309 of the metadata collection apparatus 30 is capable of receiving a request and the like issued from the client device 40 as well. The communication unit 309 is capable of transmitting various requests and the like that the metadata collection apparatus 30 issues for content management servers 20 to the recipient content management servers 20. Furthermore, the communication unit 309 is able to exchange information with the content management server 20 or a client device 40 that is directly connected to the metadata collection apparatus 30 by bypassing the communication networks 12.

It is to be noted that the functions of the metadata collection apparatus 30 are to be described in detail later.

(Client Devices 40)

Figure 5:
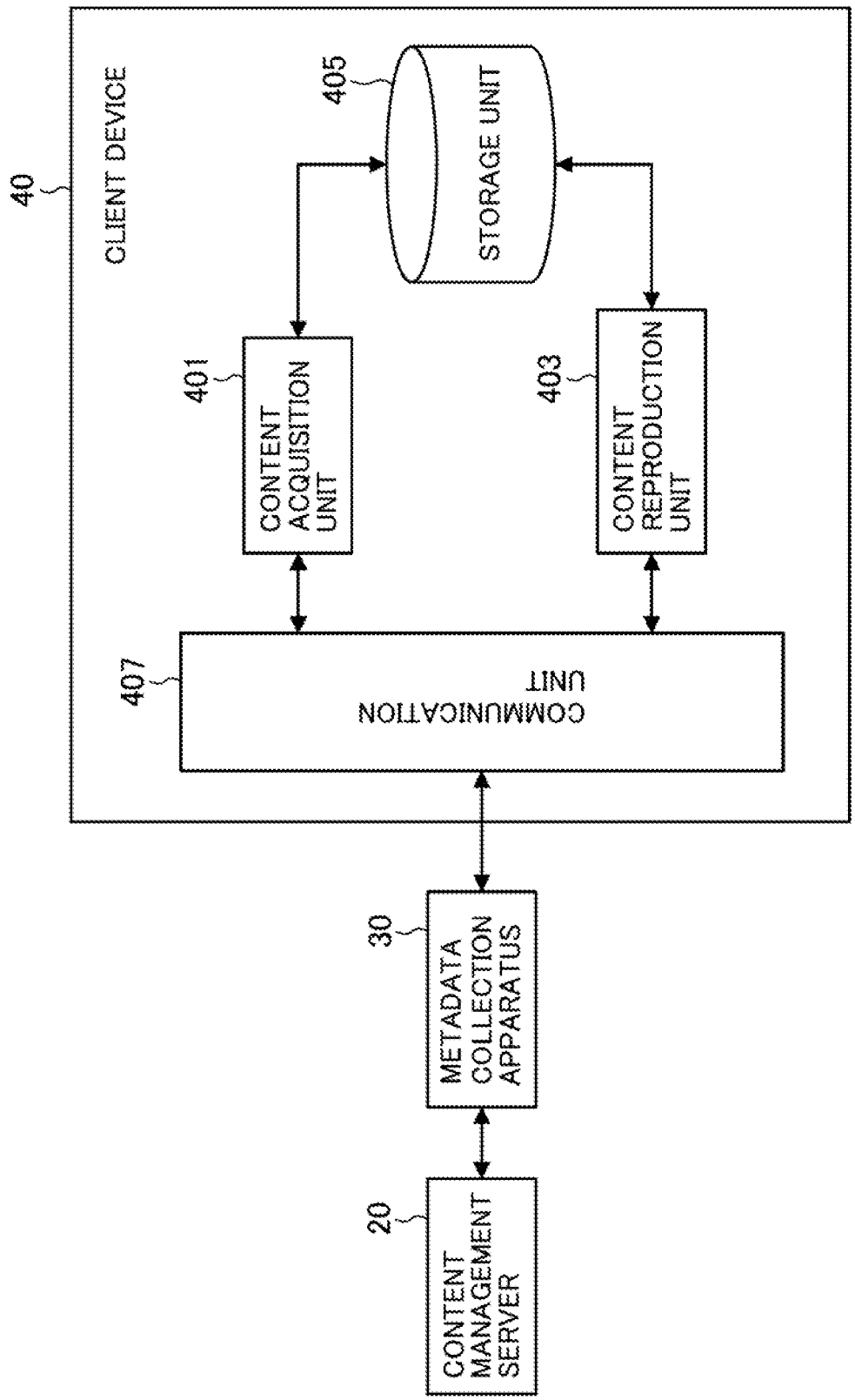
FIG. 5 is a block diagram illustrating the structure adopted in a client device in the embodiment.

Next, in reference to FIG. 5, the structure that may be adopted in the client devices 40 in the embodiment is explained in detail. FIG. 5 is a block diagram showing the structure of a client device 40 achieved in the embodiment.

As shown in FIG. 5, the client device 40 achieved in the embodiment may include, for instance, a content acquisition unit 401, a content reproduction unit 403, a storage unit 405 and a communication unit 407.

The content acquisition unit 401 references the content list by the metadata collection apparatus 30 and issues a request for a specific content management server 20 for disclosure of the tree structure generated by the content management server 20 or the content metadata therein or a request for content data to be provided thereto. The content acquisition unit 401 then obtains the tree structure, the content metadata, the content data or the like disclosed by the content management server 20 in response to the request. The content acquisition unit 401 is then able to store the tree structure, the content metadata, the content data or the like obtained from the content management server 20, the content list obtained from the metadata collection apparatus 30, and the like into the storage unit 405.

The content reproduction unit 403 reproduces the content that the client device 40 has obtained from the content management server 20. When reproducing the content, the content reproduction unit 403 reads out the content data stored in the storage unit 405 and reproduces the content. If the content thus read out is video content, the video content is reproduced and the video is output to the output device at the client device 40 through the content reproduction operation. If the content is music content, the music is reproduced and output to the output device of the client device 40 through the content reproduction operation. If the content is photo content, the photograph is output to the output device of the client device 40 through the content reproduction operation.

In the storage unit 405, the tree structures the content data related to specific content, the content metadata and the like obtained by the content acquisition unit 401 from the content management server 20, are stored into the storage unit 405. In addition, the content list having been generated by the metadata collection apparatus 30 may be stored in the storage unit 405. Moreover, various parameters that need to be saved while the client device 40 executes a specific type of processing, a processing interim status and the like can be stored as necessary into the storage unit as well as the data listed above. The content collection unit 401, the content reproduction unit 403 and the like can read data from or write data into the storage unit 405 freely.

The communication unit 407 transmits requests, issued by the content acquisition unit 401 for content management servers 20 and the metadata collection apparatus 30, to the recipient content management servers 20 and the metadata collection apparatus 30 via the communication networks 12. In addition, the communication unit 407 receives the tree structure, content metadata or content data, disclosed by a content management server 20 to the client device 40, via the communication networks 12. The communication unit 407 is also capable of exchanging information directly with a content management server 20 by bypassing the communication networks 12. Furthermore, the communication unit 407 is capable of transmitting data to a recipient outside the client device 40 in response to a request from the content acquisition unit 401 or the content reproduction unit 403 and providing data received from an outside source to the content acquisition unit 401 or the content reproduction unit 403.

It is desirable that a home network through which the client device 40 is connected to the content management servers 20 and the metadata collection apparatus 30, be in compliance with the protocol known as the universal plug and play (UPnP). The UPnP protocol, which allows a network to be configured without involving any complex operations, makes it possible to share the services provided in the individual devices connected with one another through the network among the devices connected in the network without requiring any difficult operations or settings. Another advantage of the UPnP protocol is that a new device can be added into the network with ease without having to rely on the operating system (OS) of the device.

(Operation of the Client Device 40)

As the client device 40 becomes connected with a content management server 20 via a home network or the communication networks 12 and the metadata collection apparatus 30, or as the client device 40 becomes directly connected with a content management server 20 through a USB port or an IEEE 1394 port, the client device 40 is enabled to exchange information with the content management server 20 or the metadata collection apparatus 30. In response to a disclosure request issued by the content acquisition unit 401 via the communication unit 407 to the content management server 20 for disclosure of the tree structure and content metadata, the content management server 20 discloses the tree structure or the content metadata it manages to the client device 40. The content acquisition unit 401 at the client device 40, having received via the communication unit 407 the tree structure and the content metadata disclosed by the content management server 20, stores the received tree structure or metadata into the storage unit 405.

Based upon the tree structures and the content metadata obtained from content management servers 20 via the metadata collection apparatus 30, the content acquisition unit 401 generates a content list of the content managed by the content management servers 20 on the client device 40 and outputs the content list to the output device of the client device 40.

The user of the client device 40 selects execution target content from the content list brought up on display at the output device, which may be constituted with a display unit, and, in response, the content acquisition unit 401 references the metadata of the selected content and obtains the content data from the corresponding content management server 20. The content acquisition unit 401 stores the content data it has obtained via the communication unit 407 into the storage unit 405.

The content reproduction unit 403 reads out the content data having been obtained by the content acquisition unit 401 from the storage unit 405 and reproduces the content. As a result, the content is brought up on display at the output device of the client device 40.

Examples of specific functions that may be assumed by the content management servers 20, the metadata collection apparatus 30 and the client devices 40 in the embodiment have been explained above. The individual structural elements described above may be constituted with universal members or circuits, or they may each be constituted with a hardware unit customized to fulfill the functions thereof. Alternatively, all the functions of the individual structural components may be fulfilled via a CPU or the like. In other words, the structures that may actually be assumed may be adjusted as necessary in correspondence to the level of the particular technologies adopted when implementing the embodiment.

(Tree Structure)

Figure 6:
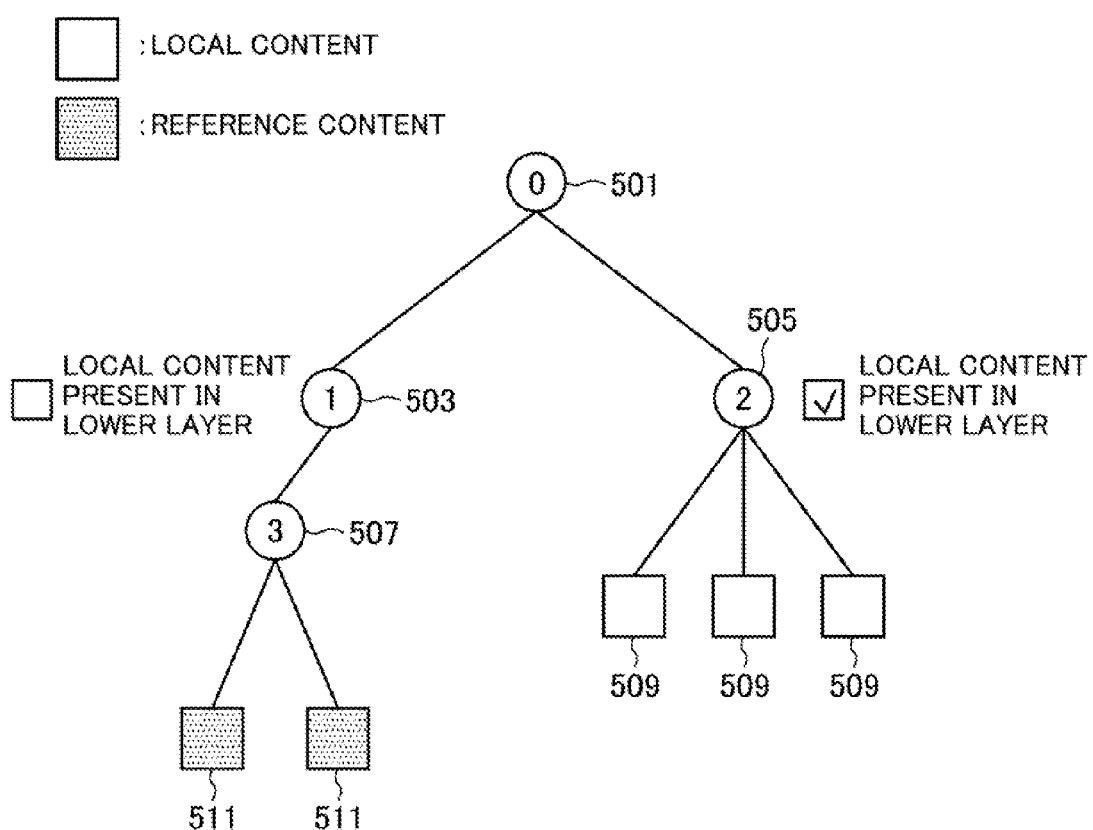
FIG. 6 provides an illustration in reference to which the tree structure achieved in the embodiment is explained.

Next, in reference to FIG. 6, the features characterizing the tree structure achieved in the embodiment are briefly explained. FIG. 6 illustrates the tree structure achieved in the embodiment.

An explanation is now given in reference to a tree structure generated by a content management server 20, which is constituted with four containers appended with IDs 0~3, as shown in FIG. 6. Under a container 501 assigned with identification ID 0, a container 503 assigned with identification ID 1 and a container 505 assigned with identification ID 2 are set and a container 507 assigned with identification ID 3 is set under the container 503 assigned with identification ID 1.

Three sets of local content 509 are allocated to the container 505 assigned with identification ID 2 and two sets of reference content 511 are allocated to the container 507 assigned with identification ID 3 in the tree structure assuming the hierarchically layered structure described above.

Under these circumstances, the container 505 assigned with identification ID 2, which is allocated with local content, is appended with a category identifier indicating that the container contains local content in the tree structure achieved in the embodiment. In addition, the category identifier indicating that local content is present is not appended to the container 503 under which the container 507 assigned with identification ID 3 is set as its subordinate container and instead, a category identifier indicating that no local content is present, is appended to the container 503. It is to be noted that while the category identifier indicating that no local content is present may be appended to the container 507 assigned with identification ID 3 instead, the identifier is appended to the container 503 assigned with identification ID 1 in the example presented in FIG. 6 so as to reduce the number of containers that the metadata collection apparatus 3 needs to search.

(Overall Tree Structure)

Figure 7:
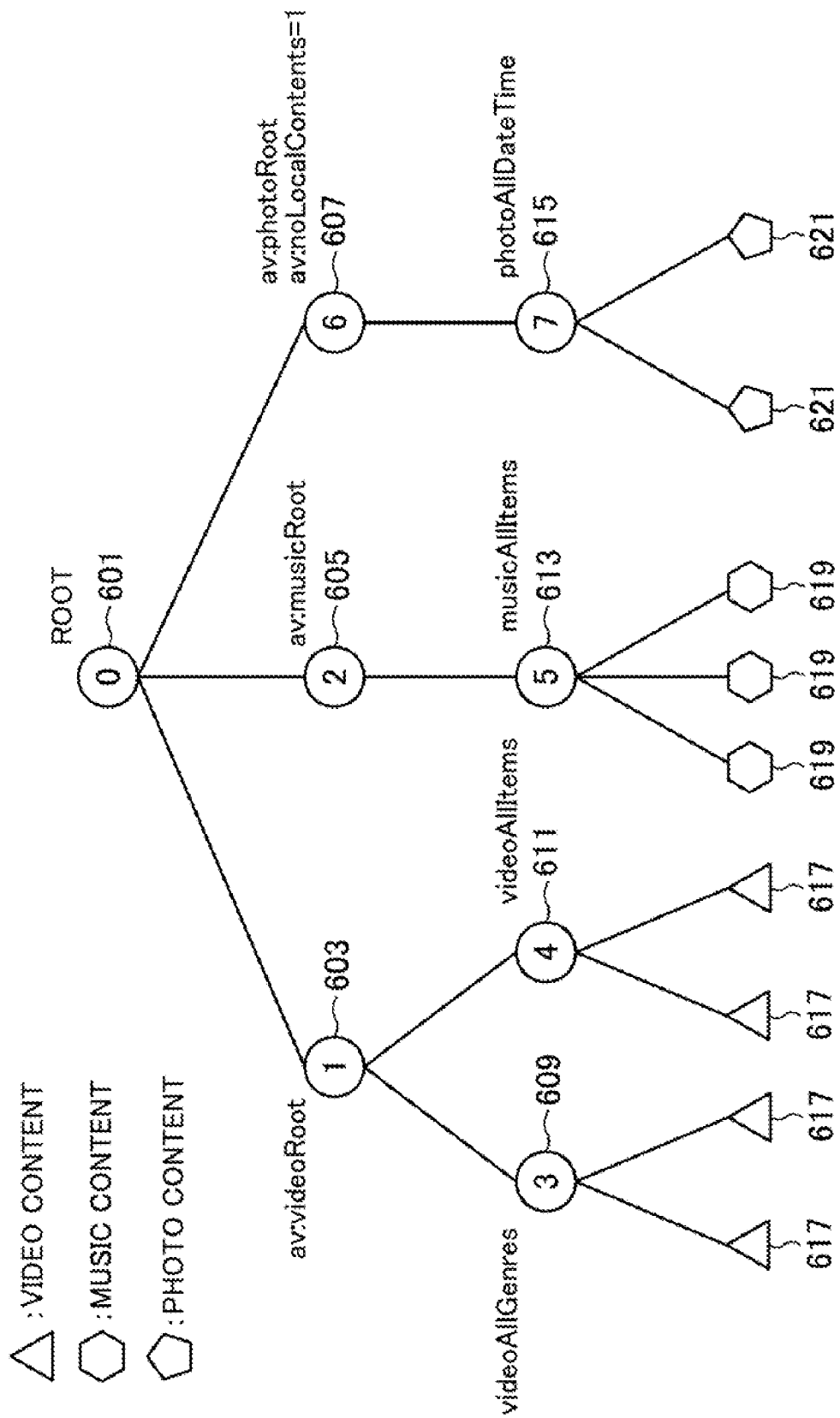
FIG. 7 provides an illustration in reference to which the tree structure achieved in the embodiment is explained.

Next, in reference to FIG. 7, the overall structure that may be adopted in tree structures generated by the content management servers 20 in the embodiment is briefly explained. FIG. 7 illustrates a tree structure achieved in the embodiment.

Each content management server 20 holds therein content such as image data, e.g., still images and dynamic images and audio data, e.g., music and metadata that include information indicating the properties of the individual sets of content, information related to the tuner engaged in live streaming data execution and the like.

AV content is allocated to a tree structure such as that shown in FIG. 7 and is managed through a content directory service (CDS).

The circles marked with numerals 1 through 7 in FIG. 7 each indicate a container. The triangles each indicate video content, the hexagons each indicate music content and the pentagons each indicate photo content.

In the tree structure shown in FIG. 7, the container assigned with ID 0 is set in a first hierarchical layer as a "ROOT" container 601. The identifier "ROOT" appended to the container with ID 0 indicates that the corresponding highest-order hierarchical layer container service is available through the corresponding container in the tree structure having been generated by the tree structure generation unit 231 in the container management server 20. Identifiers that are added to the device description described earlier with regard to the containers constituting part of the tree structure so as to enable the metadata collection apparatus 30 and the client devices 40 to search the tree structure for desired content with a high level of efficiency.

A container 603 assigned with ID 1, a container 605 assigned with ID 2 and a container 607 assigned with ID 6 are set in a second hierarchical layer immediately below the "ROOT" container 601. An identifier "av:videoRoot" is written in correspondence to the container 603 assigned with ID 1 in the device description, and an identifier "av:musicRoot" is written in correspondence to the container 605 assigned with ID 2 in the device description and an identifier "av:photoRoot" is written in correspondence to the container 607 assigned with ID 6 in the device description.

The "av:videoRoot" identifier indicates that a service as "a single container assuming a position in the highest-order hierarchical layer among a group of containers allocated with video content" is available through the container 603 appended with the identifier. All the video content managed in the content management server 20 is set in correspondence to the hierarchical layer under the container appended with the "av:videoRoot" identifier.

The "av:musicRoot" identifier indicates that a service as "a single container assuming a position in the highest-order hierarchical layer among a group of containers allocated with music content" is available through the container 605 appended with the identifier. All the music content managed in the content management server 20 is set in correspondence to the hierarchical layer under the container appended with the "av:musicRoot" identifier.

The "av:photoRoot" identifier indicates that a service as "a single container assuming a position in the highest-order hierarchical layer among a group of containers allocated with photo content" is available through the container 607 appended with the identifier. All the photo content managed in the content management server 20 is set in correspondence to the hierarchical layer under the container appended with the "av:photoRoot" identifier.

With the "av:videoRoot" identifier appended to the container 603, for instance, the container 603, containers set in lower-order hierarchical layers relative to the container 603, the content allocated to these containers and the like constitute a video tree subgroup to which only video content is set in correspondence. With the "av:musicRoot" identifier appended to the container 605, the container 605, containers set in lower-order hierarchical layers relative to the container 605, the content allocated to these containers and the like constitute a music tree subgroup to which only music content is set in correspondence. Likewise, with the "av:photoRoot" identifier appended to the container 607, the container 607, containers set in lower-order hierarchical layers relative to the container 607, the content allocated to these containers and the like constitute a photo tree subgroup to which only photo content is set in correspondence.

By appending identifiers defined as described above to containers, it is ensured that the metadata collection apparatus 30 or a client device 40, referencing the tree structure generated at the content reference server 20 to search for a container in correspondence to which video content is set, is able to look for the container appended with the "av:videoRoot" identifier so as to selectively reference and search the hierarchical layers under this particular container to achieve better efficiency in content viewing/search.

As subordinate containers of the container 603 appended with the "av:videoRoot" identifier, a container 609 appended with an identifier "videoAllGenres" and a container 611 appended with "videoAllItems" are set. The container 609 is assigned with ID 3 and whereas the container 611 is assigned with ID 4.

The "videoAllGenres" identifier and the "videoAllItems" identifier are "av:containerClass" identifiers each indicating the classification of the content allocated to the corresponding container. The "videoAllGenres" identifier indicates that video content sorted in correspondence to the individual genres is set in correspondence to the container and in the lower-order hierarchical layer relative to the container 609 appended with this identifier, video content 617 sorted in correspondence to specific genres are set. The "videoAllItems" identifier indicates that all video content is set in correspondence to the particular container and, accordingly, all the video content 617 managed in the content management server 20 is set in correspondence to the lower-order hierarchical layer relative to the container 611 appended with this identifier.

The video content 617 allocated to the container 609 appended with the "videoAllGenres" identifier and the video content 617 allocated to the container 611 appended with the "videoAllItems" identifier may overlap. While the video content 617 is allocated based upon, for instance, the identifiers appended to containers, a given set of video content 617 may be set under a plurality of containers appended with different identifiers as long as the particular set of video content satisfies the conditions that allow it to be allocated to each of these containers.

In addition, while FIG. 7 shows only two containers set in the lower-order hierarchical layer relative to the "av:videoRoot" with the two identifiers described above each appended to one of these two containers, a video content-related identifier other than those described above may be appended to a container in the tree structure achieved in the embodiment. It is to be noted that the video tree in correspondence to which video content is set is to be described in detail later.

As a subordinate container of the container 605 appended with the "av:musicRoot" identifier, a container 613 appended with an identifier "musicAllItems" is set. The container 613 is assigned with ID 5.

The "musicAllItems" identifier is one of "av:containerClass" identifiers indicating the classifications of content allocated to various containers. The "musicAllItems" identifier indicates that all music content is set in correspondence to the particular container and, accordingly, all the music content 619 managed in the content management server 20 is set in correspondence to the lower-order hierarchical layer relative to the container 613 appended with this identifier.

In addition, while FIG. 7 shows only one container set in the lower-order hierarchical layer relative to the "av:musicRoot" with the identifier described above appended to the container, a music content-related identifier other than that described above may be appended to a container in the tree structure achieved in the embodiment. It is to be noted that the music tree in correspondence to which music content is set is to be described in detail later.

As a subordinate container of the container 607 appended with the "av:photoRoot" identifier, a container 615 appended with an identifier "photoAllDateTime" is set. The container 615 is assigned with ID 7.

The "photoAllDateTime" identifier is one of "av:containerClass" identifiers indicating the classifications of content allocated to various containers. The "photoAllDateTime" identifier indicates that photo content sorted in correspondence to specific photographing dates is set in correspondence to the container and photo content 621 sorted in correspondence to photographing dates is set in correspondence to the lower-order hierarchical layer relative to the container 615 appended with this identifier.

In addition, if the photo content 621 allocated to the container 615 is all reference content, an identifier "av:noLocalConent=1" indicating that no local content is present is appended to the container 605 as shown in FIG. 7.

In addition, while FIG. 7 shows only one container set in the lower-order hierarchical layer relative to the "av:photoRoot" with the identifier described above appended to the container, a photo content-related identifier other than that described above may be appended to a container in the tree structure achieved in the embodiment. It is to be noted that the photo tree in correspondence to which photo content is set is to be described in detail later.

A plurality of sets of content managed in the content management server 20 are allocated to specific containers in the tree structure shown in FIG. 7 by the content allocation unit 233 based upon the identifiers appended to the containers and content attribute information. For instance, based upon the data format of a given set of content, a decision is made with regard to exactly where the data should be allocated, i.e., the lower-order hierarchical layer relative to the "av:videoRoot" container, the "av:musicRoot" container or the "av:photoRoot" container. Once the specific subgroup to which the set of data is to be allocated is determined, the container to which the data are to be allocated is determined based upon additional information included in the content attribute information, such as content genre information or date information.

While the tree structure shown in FIG. 7 includes eight containers and four hierarchical layers, the number of containers set in the tree structure achieved in the embodiment is not limited to eight and any number of containers may be set in the tree structure. In addition, the number of hierarchical layers in the tree structure is not limited to four as in the example presented in FIG. 7 and as many as 10 hierarchical layers may be generated overall. Furthermore, the IDs appended to the individual containers in FIG. 7 simply represent examples and any appropriate ID may be assigned to each container in the tree structure achieved in the embodiment as long as no ID is assigned in duplicate.

(Structure of the Video Tree)

Figure 8:
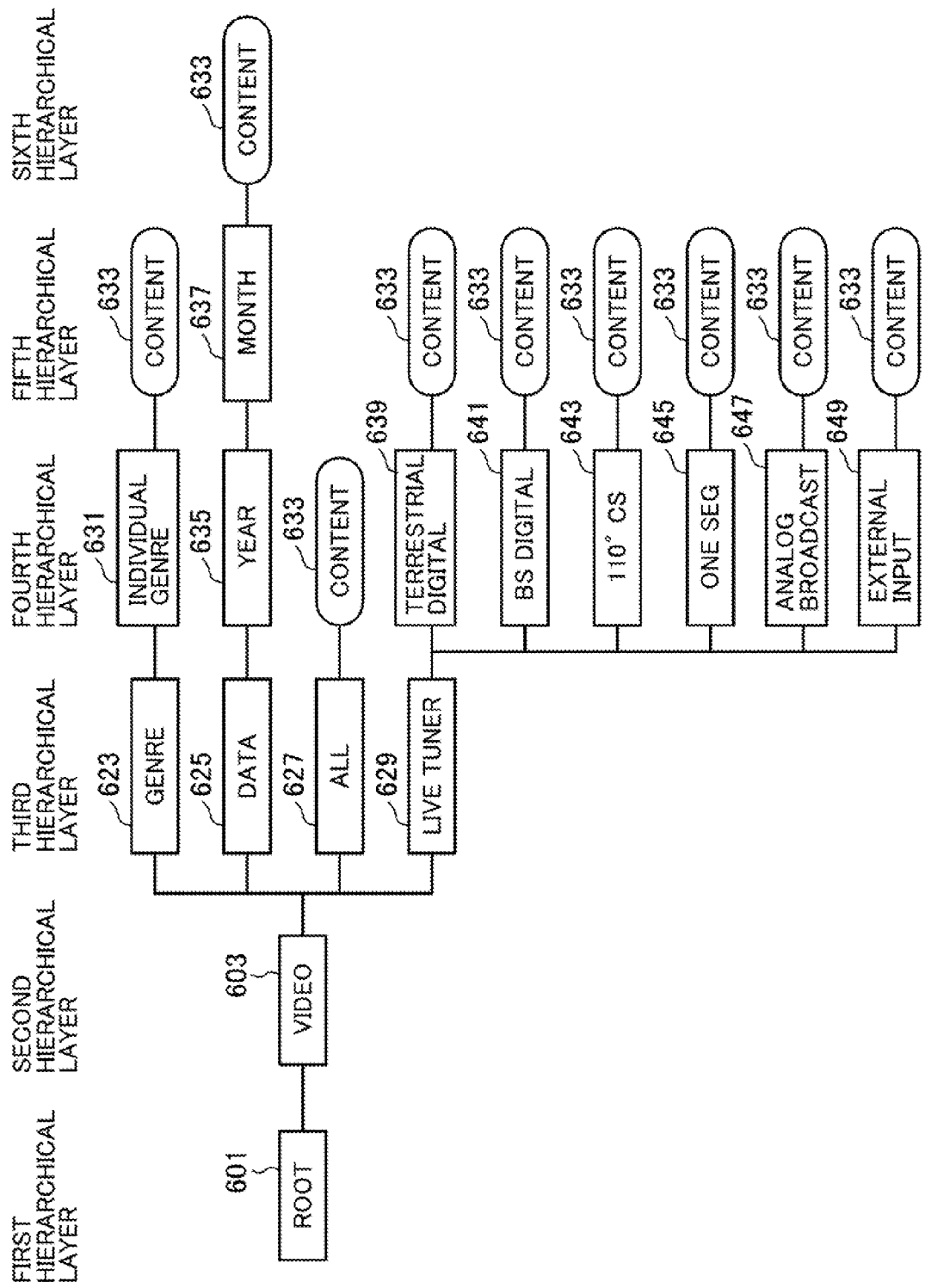
FIG. 8 illustrates how video content may be allocated in the embodiment.

In reference to FIG. 8, a specific example of the video tree achieved in the embodiment is explained in detail. FIG. 8 illustrates how video content may be allocated in the embodiment.

As the overall structure of the video tree shown in FIG. 8 indicates, the video tree includes six hierarchical layers, first through sixth hierarchical layers, with the [video] container 603 appended with the "av:videoRoot" identifier set immediately under the first hierarchical layer in which the [ROOT] container 601 is set. The [video] container 603 takes up the second hierarchical layer. Four containers set in the third hierarchical layer are subordinate containers of the [video] container 603. The containers set in the third hierarchical layer may be, for instance, a [genre] container 623, a [date] container 625, an [All] container 627 and a [live tuner] container 629.

In the [genre] container 623, video content is sorted based upon the genre information included in the content attribute information. A "videoAllGenres" identifier, for instance, may be appended to the container 623. As a subordinate container of the [genre] container 623 an [individual genre] container 631 corresponding to a specific genre such as movies, dramas or variety shows, is set. It is to be noted that while FIG. 8 shows only one [individual genre] container 631 set in the fourth hierarchical layer, a plurality of [individual genre] containers 631 are actually set based upon the genre information included in the content attribute information. In the hierarchical layer under the hierarchical layer assumed by the plurality of [individual genre] containers 631, a plurality of sets of video content 623 are set as items in correspondence to each genre.

In the [date] container 625, video content is sorted based upon the date information included in the content attribute information. A "videoAllDateTime" identifier, for instance, may be appended to the container 625. As subordinate containers of the [date] container 625, [year] containers 635 are set, in correspondence to which content is sorted based upon the year in which the content was created, and as subordinate containers of each [year] container 635, [month] containers 637 are set in correspondence to which the content is sorted based upon the month in which it was created. In the hierarchical layer under the [month] containers 637, a plurality of sets of content 633 are set based upon the date information included in the content attribute information.

While the [year] containers 635 and the [month] containers 637 are set in the lower-order hierarchical layers relative to the [date] container 625 in FIG. 8, [year/month/day] containers via which content is sorted based upon year/month/day information may be set in the fourth hierarchical layer as subordinate containers of the [date] container 625 if, for instance, a significant number of sets of content managed in the content management server 20 have the same date (e.g., if the content management server 20 is a video recorder capable of simultaneously recording a plurality of sets of program content). In such a case, the video content will be allocated to the fifth hierarchical layer.

To the [all] container 627, all the video content 633 managed in the content management server 20 is allocated as items. A "videoAllGenres" identifier, for instance, may be appended to this container 627.

Live streaming content is allocated to the [live tuner] container 629. A "videoAllTuners" identifier, for instance, may be appended to the container 629. A [terrestrial digital] container 639, a [BS digital] container 641, a [110° CS] container 643, a [1-seg] container 645, an [analog broadcast] container 647, an [external input] container 649 and the like each corresponding to a specific live streaming tuner type, are set as subordinate containers of the [live tuner] container 629. Video content 633 are assigned as content items in the lower-order hierarchical layer relative to these containers.

In addition to the metadata collection apparatus 30 and the client devices 40 achieved in the embodiment, a client device manufactured by, for instance, another manufacturer connected to a content management server 20 in the embodiment needs to be able to view the video tree. Accordingly, a container that the video tree must include under any circumstances (hereafter referred to as an essential container) can be defined. While any container can be designated as an essential container in correspondence to the specific set of circumstances under which the content management server 20 is utilized, the [genre] container 623 and the [all] container 627 among the containers in the third hierarchical layer may be designated as essential containers if, for instance, the number of sets of content managed in the content management server is relatively small, e.g., several hundreds. If, on the other hand, the number of sets of content managed in the content management server is relatively large, e.g., several thousands or several tens of thousands, the [genre] container 623 and the [date] container 625 may be designated as essential containers.

In addition, while specific identifiers may be appended to the [individual genre] containers 631, the [year] containers 635 and the [month] containers 637, it is not strictly necessary to attend identifiers to these containers.

Based upon the identifier appended to a container in the video tree generated as described above, the metadata collection apparatus 30 collecting metadata or a client device 40 accessing or searching for content is able to judge details related to the containers, the content and the like allocated in the lower hierarchical layers relative to the container. In addition, the metadata collection apparatus 30 collecting metadata or a client device 40 accessing or searching for content is able to select optimal containers in the various hierarchical layers starting with the first hierarchical layer in a highly efficient manner by sequentially searching through the subordinate containers of the selected containers. In short, the tree structure achieved in the embodiment differs from tree structures in the related art in that the content in the tree structure can be accessed without having to go back and forth between higher-order hierarchical layers and lower-order hierarchical layers.

For instance, the metadata collection apparatus 30 collecting the metadata related to all the video content managed in the content management server 20 does not need to search through the entire tree structure generated in the content management server 20. Instead, it is able to collect the metadata related to all the video content simply by searching through the container appended with the "videoAllItems" identifier. As a result, very efficient metadata collection is assured.

Likewise, the metadata collection apparatus 30 collecting the content metadata in a specific genre alone among the video content managed in the content management server 20 simply needs to search through the container appended with the "videoAllGenres" identifier and then search through the container in the target genre corresponding to which the metadata are to be collected, allocated in the lower-order hierarchical layer relative to the container appended with the "videoAllGenres" identifier. In this case, too, the desired metadata can be collected with a high level of efficiency.

(Structure of the Music Tree)

Figure 9:
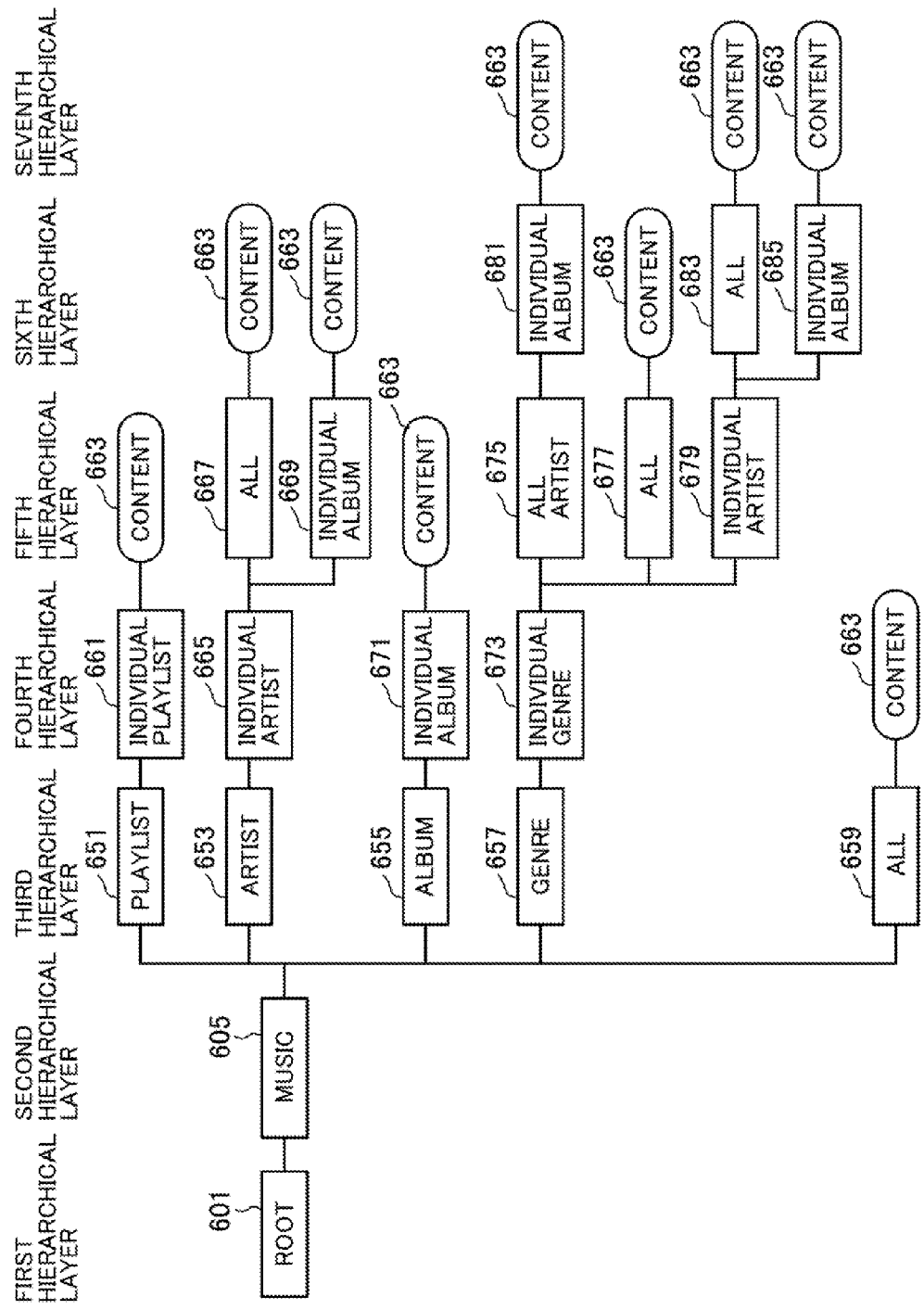
FIG. 9 illustrates how music content may be allocated in the embodiment.

In reference to FIG. 9, a specific example of the music tree achieved in the embodiment is explained in detail. FIG. 9 illustrates how music content may be allocated in the embodiment.

As the overall structure of the music tree shown in FIG. 9 indicates, the music tree includes seven hierarchical layers, first through seventh hierarchical layers, with the [music] container 605 appended with the "av:musicRoot" identifier set immediately under the first hierarchical layer in which the [ROOT] container 601 is set. The [music] container 605 takes up the second hierarchical layer. Five containers set in the third hierarchical layer are subordinate containers of the [music] container 605. The containers set in the third hierarchical layer may be, for instance, a [playlist] container 651, an [artist] container 653, an [album] container 655, a [genre] container 657 and an [all] container 659.

In the [playlist] container 651, the playlists set by the owner of the content management server 20 are sorted. The container 651 may be appended with, for instance, a "musicAllPlaylists" identifier. The [individual playlist] containers 661 into which the individual playlists having been set by the owner of the content management server 20 are sorted are disposed as subordinate containers of the [playlist] container 651. It is to be noted that while FIG. 9 only shows a single [individual playlist] container 661 in the fourth hierarchical layer, in fact, a plurality of [individual playlist] containers 661 are set in the fourth hierarchical layer. In addition, in the lower hierarchical layer relative to the plurality of [individual playlist] containers 661, a plurality of sets of music content 663 contained in the individual playlists are allocated as content items.

In the [artist] container 653, music content is sorted based upon the artist information included in the content attribute information. A "musicAllArtists" identifier, for instance, is appended to the container 653. As subordinate containers of the [artist] container 653, [individual artist] containers 665 each corresponding to a specific artist name, group name or the like are set. It is to be noted that while FIG. 9 only shows a single [individual artist] container 665 in the fourth hierarchical layer, in fact, a plurality of [individual artist] containers 665 are set in the fourth hierarchical layer based upon the artist information included in the content attribute information.

As subordinate containers of each of the plurality of [individual artist] containers 665, an [all] container 667 and [individual album] containers 669 may be set. To the [all] container 667, all the music content 663 by the artist corresponding to the superior container of the [all] container 667 is set in correspondence as content items. In addition, all the albums managed in the content management server 20, recorded by the artist corresponding to the superior container of the [individual album] containers 669 are each set in one of the [individual album] containers 669. It is to be noted that while FIG. 9 shows a single [individual album] container 669 allocated in the fifth hierarchical layer, in fact a plurality of [individual album] containers, each corresponding to an album recorded by the artist represented by the superior container, are set. In addition, in the lower hierarchical layer relative to the plurality of [individual album] containers 669, music content 663 contained in the individual albums is allocated as content items.

In the [album] container 655, music content is sorted based upon the album information included in the content attribute information. A "musicAllAlbums" identifier, for instance, may be appended to the container 655. As subordinate containers of the [album] container 655 [individual album] containers 671, each allocated with one of the albums managed in the content management server 60, are set irrespective of the specific artist names or the like. It is to be noted that while FIG. 9 shows a single [individual album] container 671 allocated in the fourth hierarchical layer, a plurality of [individual album] containers are in fact set in the fourth hierarchical layer, based upon the album information included in the content attribute information. In addition, in the lower hierarchical layer relative to the plurality of [individual album] containers 671, a plurality of sets of music content 663 contained in the individual albums are allocated as content items.

In the [genre] container 657, music content is sorted based upon the genre information included in the content attribute information. A "musicAllGenres" identifier, for instance, may be appended to the container 657. As subordinate containers of the [genre] container 657 [individual genre] containers 673 allocated with all the music content managed in the content management server 20 based upon the genre information included in the content attribute information, are set irrespective of the specific artist names or album titles. It is to be noted that while FIG. 9 shows a single [individual genre] container 673 allocated in the fourth hierarchical layer, a plurality of [individual genre] containers 673 are in fact set in the fourth hierarchical layer based upon the genre information included in the content attribute information.

As subordinate containers of each [individual genre] container 673, an [all artists] container 675, and [all] container 677 and [individual artist] containers 679, for instance, may be set.

In the [all artists] container 675, the music content with the genre information included in the content attribute information thereof indicating a genre matching the individual genre represented by the superior container is sorted irrespective of artist names. As subordinate containers of the [all artists] container 675, [individual album] containers 681, each allocated with one of the albums sorted into the genre matching the genre represented by the [individual genre] container 673, are set. In addition, in the lower hierarchical layer relative to the [individual album] containers 681, music content 663 contained in the individual albums is allocated as content items.

In the [all] container 677, all the music content with genre information indicating the genre matching the genre represented by the superior container, i.e., the corresponding [individual genre] container 673, is sorted. To the lower hierarchical layer relative to the container 677, all the music content 663 with genre information indicating the genre matching that represented by the [individual genre] container 673 is set in correspondence.

All the music content with genre information indicating the genre matching the genre represented by the superior container, i.e., a specific [individual genre] container 673, is sorted into [individual artist] containers 679 in correspondence to the individual artist names. While FIG. 9 shows a single [individual artist] container 679 set in the fifth hierarchical layer, a plurality of [individual artist] containers are in fact set in a quantity matching the number of artists belonging to the genre matching the specific genre represented by the superior container. As subordinate containers of each [individual artist] container 679, an [all] container 683 and [individual album] containers 685 are set in correspondence to the specific artist. To the lower-order hierarchical layer relative to the [all] container 683, all the music content 663 recorded by the artist represented by the [individual artist] container 679, among the music content in the genre matching the genre represented by the [individual genre] container 673, is set in correspondence. In addition, the music content recorded by the artist represented by the [individual artist] container 679, among the music content in the genre matching the genre represented by the [individual genre] container 673, is allocated to the [individual album] containers 685 each corresponding to an album by this particular artist. To the lower hierarchical layer relative to the [individual album] containers 685, the music content 663 contained in the individual albums is set in correspondence.

To the [all] container 659, all the music content managed in the content management server 20 is allocated. A "musicAllItems" identifier, for instance, may be appended to this container 659. The music content 663 managed in the content management server 20 is allocated as content items in the lower-order hierarchical layer relative to the [all] container 659. It is to be noted that this [all] container 659 may be utilized for, for instance, shuffle play of the music content at a client device 40.

Based upon the identifier appended to a container in the music tree generated as described above, the metadata collection apparatus 30 collecting metadata or a client device 40 accessing or searching for content is able to judge details related to the containers, the content and the like allocated in the lower hierarchical layers relative to the container. In addition, the metadata collection apparatus 30 collecting metadata or a client device 40 accessing or searching for content is able to select optimal containers in the various hierarchical layers starting with the first hierarchical layer in a highly efficient manner by sequentially searching through the subordinate containers of the selected containers. In short, the tree structure achieved in the embodiment differs from tree structures in the related art in that the content in the tree structure can be accessed without having to go back and forth between higher-order hierarchical layers and lower-order hierarchical layers.

For instance, the metadata collection apparatus 30 collecting the metadata related to all the music content managed in the content management server 20 does not need to search through the entire tree structure generated in the content management server 20. Instead, it is able to collect the metadata related to all the music content simply by searching through the container appended with the "musicAllItems" identifier. As a result, very efficient metadata collection is assured.

Likewise, the metadata collection apparatus 30 collecting the metadata related to content by a specific artist alone among the music content managed in the content management server 20 simply needs to search through the container appended with the "musicAllArtists" identifier and then search through the container assigned to the target artist corresponding to which the metadata are to be collected, allocated in the lower-order hierarchical layer relative to the container appended with the "musicAllArtists" identifier. In this case, too, the desired metadata can be collected with a high level of efficiency.

In addition to the metadata collection apparatus 30 and the client devices 40 achieved in the embodiment, a client device manufactured by, for instance, another manufacturer connected to a content management server 20 in the embodiment needs to be able to view the music tree. Accordingly, an essential container that the music tree must include can be defined as well. While any container can be designated as an essential container in correspondence to the specific set of circumstances under which the content management server 20 is utilized, the [playlist] container 651 and the [individual playlist] containers 661 set in the fourth hierarchical layer as the subordinate containers of the [playlist] container 651 may be designated as essential containers.

(Structure of the Photo Tree)

Figure 10:
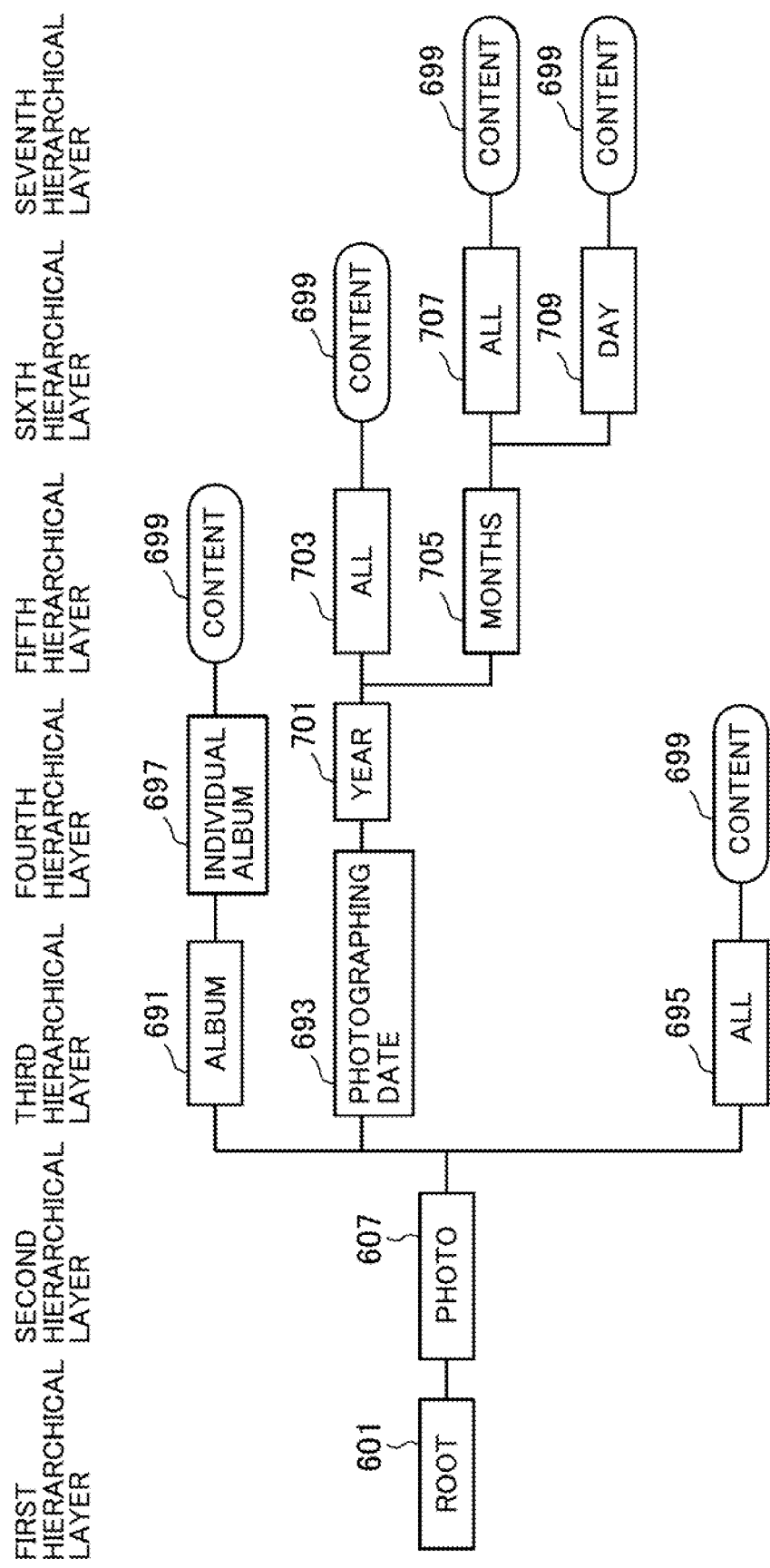
FIG. 10 illustrates how photo content may be allocated in the embodiment.

In reference to FIG. 10, a specific example of the photo tree achieved in the embodiment is explained in detail. FIG. 10 illustrates how photo content may be allocated in the embodiment.

As the overall structure of the photo tree shown in FIG. 10 indicates, the photo tree includes seven hierarchical layers, first through seventh hierarchical layers, with the [photo] container 607 appended with the "av:photoRoot" identifier set immediately under the first hierarchical layer in which the [ROOT] container 601 is set. The [photo] container 607 takes up the second hierarchical layer. For containers set in the third hierarchical layer are subordinate containers of the [photo] container 607. The containers set in the third hierarchical layer may be, for instance, an [album] container 691, a [photographing date] container 693 and an [all] container 695.

In the [album] container 691, photo content is sorted based upon the album information included in the content attribute information. The "photoAllAlbums" identifier, for instance, may be appended to the container 691. As subordinate containers of the [album] container 691, [individual album] containers 697, each allocated with one of the albums managed in the content management server 20, are set. It is to be noted that while FIG. 10 shows a single [individual album] container 697 allocated in the fourth hierarchical layer, a plurality of [individual album] containers are in fact set in the fourth hierarchical layer, based upon the album information included in the content attribute information. In addition, in the lower hierarchical layer relative to the plurality of [individual album] containers 697, a plurality of sets of photo content 699 registered in the individual albums are allocated as content items.

In the [photographing date] container 693, photo content is sorted based upon the date information included in the content attribute information. A "photoAllDateTime" identifier, for instance, may be appended to the container 693. As subordinate containers of the [photographing date] container 693, [year] containers 701 in correspondence to which the photo data managed in the content management server 20 are sorted based upon the photographing years are set. In addition, as subordinate containers of each [year] container 701, an [all] container 703, to which all the photo content photographed in the corresponding year is set irrespective of the photographing month/date and [month] containers 705 into which the photo content photographed during the year is sorted in correspondence to the photographing months, are set in the fifth hierarchical layer. To the lower hierarchical layer relative to the [all] container 703, all the photo content 699 photographed in the year is set in correspondence.

In addition, as subordinate containers of each [month] container 705, an [all] container 707 to which all the photo content photographed in the corresponding month is set irrespective of the photographing dates and [day] containers 709, into which the photo content photographed during the month is sorted in correspondence to the photographing dates are set in the sixth hierarchical layer. To the lower hierarchical layer relative to the [all] container 707, all the photo content 699 photographed during the month is set in correspondence, and to the lower hierarchical layer relative to the [day] containers 709, the photo content 699 sorted in correspondence to the individual photographing dates is set in correspondence.

While FIG. 10 shows a [year] container 701 allocated to the fourth hierarchical layer, the [all] container 703 and a [month] container 705 allocated to the fifth hierarchical layer and the [all] container 707 and a [day] container 709 allocated to the sixth hierarchical layer under the [photographing date] container 693, the types of containers to be set under the [photographing date] container 693 may be adjusted in correspondence to the number of sets of photo content managed in the content management server 20.

For instance, if the number of sets of photo content photographed on any given day is relatively small, a [year] container may be set in the fourth hierarchical layer and an [all] container and [month/day] containers may be set as subordinate containers of each [year] container. In addition, if the number of sets of photo content managed in the content management server 20 is small, only [year/month/day] containers may be set as subordinate containers of the [photographing date] container 693.

Furthermore, to the [all] container 695 set in the third hierarchical layer, all the photo content managed in the content management server 20 is set in correspondence, irrespective of the attribute information related to the photo content. The individual sets of photo content are set in correspondence to the lower hierarchical layer relative to the container 695. The container 695 may be appended with, for instance, a "photoAllItems" identifier.

In addition to the metadata collection apparatus 30 and the client devices 40 achieved in the embodiment, a client device manufactured by, for instance, another manufacturer connected to a content management server 20 in the embodiment needs to be able to view the photo tree. Accordingly, an essential container that the photo tree must include can be defined as well. While any container can be designated as an essential container in correspondence to the specific set of circumstances under which the content management server 20 is utilized, the [album] container 691, the [all] container 695 and the [individual album] containers 697 may be designated as essential containers.

Based upon the identifier appended to a container in the photo tree generated as described above, the metadata collection apparatus 30 collecting metadata or a client device 40 accessing or searching for content is able to judge details related to the containers, the content and the like allocated in the lower hierarchical layers relative to the container. In addition, the metadata collection apparatus 30 collecting metadata or a client device 40 accessing or searching for content is able to select optimal containers in the various hierarchical layers starting with the first hierarchical layer in a highly efficient manner by sequentially searching through the subordinate containers of the selected containers. In short, the tree structure achieved in the embodiment differs from tree structures in the related art in that the content in the tree structure can be accessed without having to go back and forth between higher-order hierarchical layers and lower-order hierarchical layers.

For instance, the metadata collection apparatus 30 collecting the metadata related to all the photo content managed in the content management server 20 does not need to search through the entire tree structure generated in the content management server 20. Instead, it is able to collect the metadata related to all the photo content simply by searching through the container appended with the "photoAllItems" identifier. As a result, very efficient metadata collection is assured.

By appending a specific category identifier indicating that either local content or reference content is present to each of the containers constituting the tree structure generated based upon a predetermined rule, as described above, the metadata collection apparatus 30 or a client device 40 searching through the tree structure is able to collect metadata or search for specific content with a high level of efficiency.

When reference content is allocated to a container in the tree structure achieved in the embodiment, any of the identifiers listed in FIG. 11, for instance, may be added to the reference content metadata.

For instance, an "av:orgTitle" identifier indicating the initial title, which does not include the item reference source server name (the name of the content management server 20 managing the content data corresponding to the reference content), an "av:orgUuid" indicating the UUID of the item reference source server, an "av:orgServerName" identifier indicating the name assigned to the item reference source server or an "av:orgMacAddress" identifier indicating the MAC address of the item reference source server may be added to the reference content metadata. In addition, an "av:orgAlive" identifier indicating whether or not the power to the reference source server has been turned on may be added to the reference content metadata.

Such identifiers may also be included in the device description "res" (at the location where the resource-related information is written) corresponding to the content, as shown in FIG. 11 (except for "av:orgTitle").

(Metadata Collection Method)

Figure 12:
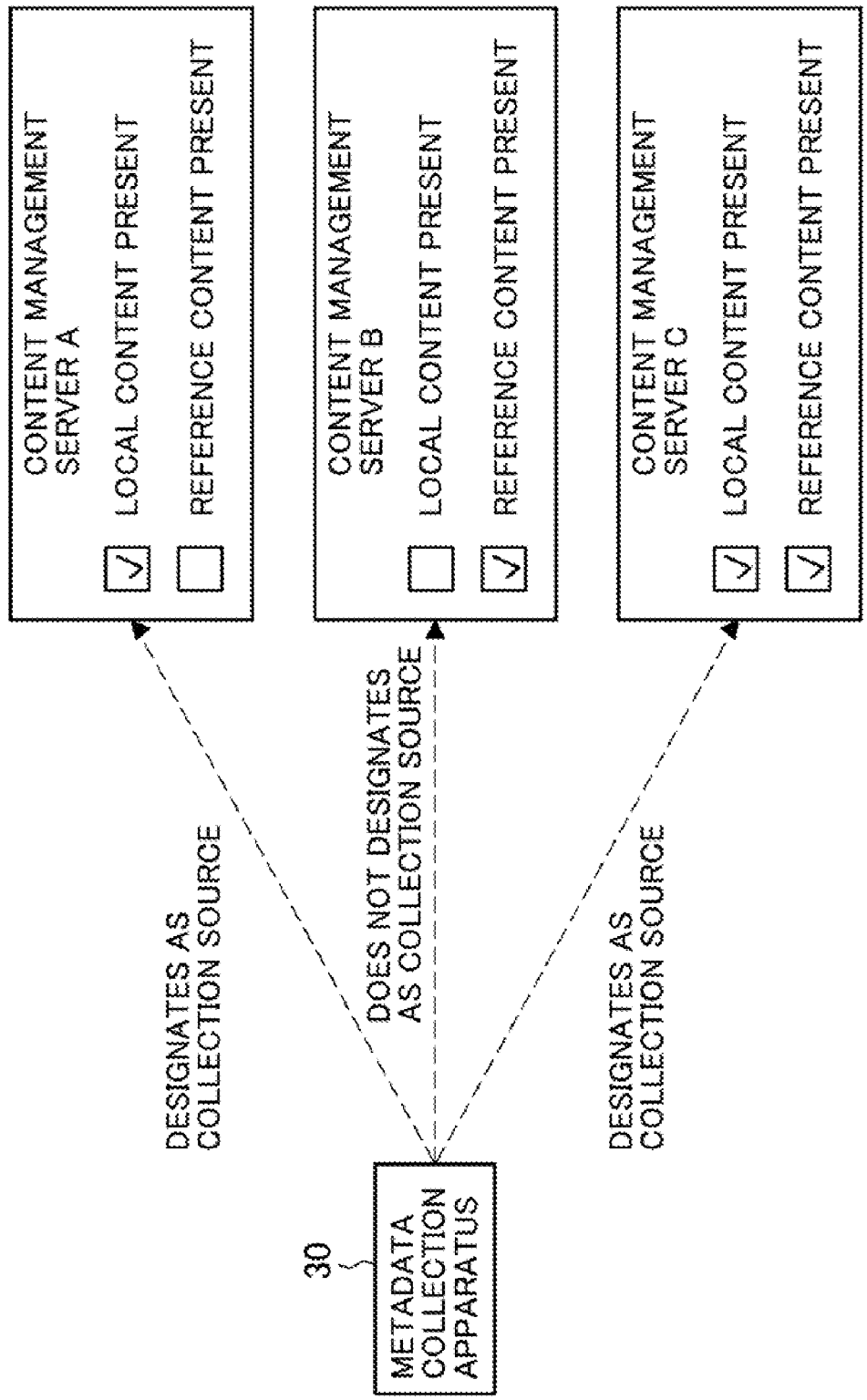
FIG. 12 provides an illustration in reference to which the metadata collection apparatus achieved in the embodiment is explained

Next, in reference to FIGS. 12 through 18, the methods adopted in the embodiment for metadata collection are explained in detail. FIGS. 12[1] through 18 each present a flowchart related to the metadata collection executed in the embodiment.

As shown in FIG. 12, the metadata collection apparatus 30 in the embodiment references the identification flags included in the server information at various content management servers 20. Then, it designates a content management server 20 with an identification flag indicating that local content is present as a metadata collection source. In the example presented in FIG. 12, a content management server A and a content management server C each hold an identification flag indicating that local content is present and accordingly, the metadata collection apparatus 30 designates these servers as metadata collection sources. Since a content management server B does not hold an identification flag indicating that local content is present, the metadata collection apparatus 30 does not designate the content management server B as a metadata collection source.

Such an identification flag may be the identification flag "av:aggregationFlags" mentioned earlier. This identification flag is written

[1] check number in the device description at each content management server 20. As explained earlier, the "av:aggregationFlags" may be a two-bit identification flag constituted with two elements "ag-val" and "lc-val".

By selecting specific settings for the elements "ag-val" and "lc-val" and assuming various combinations of the settings, four different types of information indicating the types of content managed in the individual content management servers 20 can be provided through the identification flag "av:aggregationFlags".

Next, in reference to FIGS. 13 through 18, the methods adopted in the embodiment for metadata collection are explained in detail.

Figure 13:
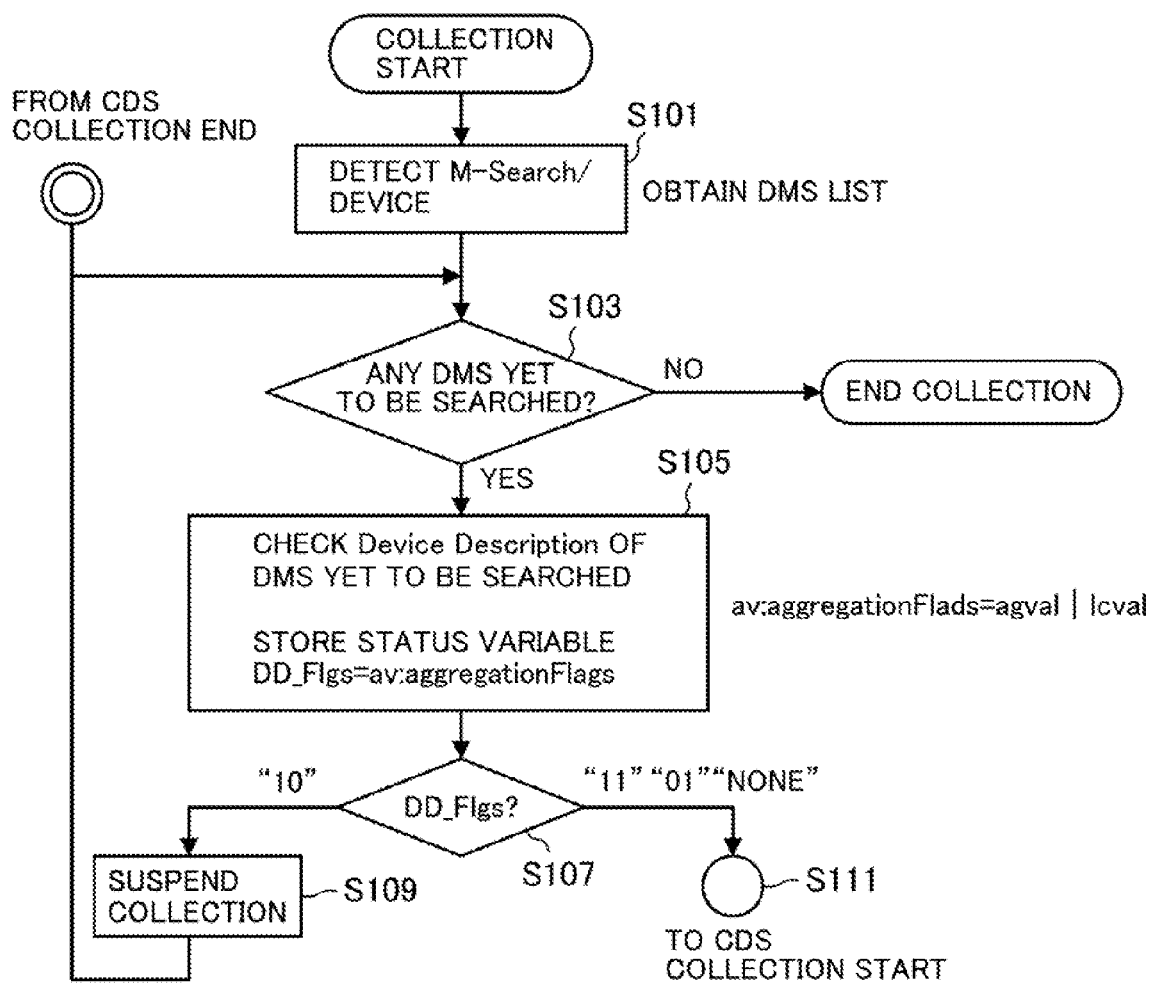
FIG. 13 presents a flowchart of the metadata collection executed in the embodiment.

As shown in FIG. 13, the metadata collection unit 301 in the metadata collection apparatus 30 achieved in the embodiment first issues an M-Search request and obtains a list of the content management servers 20 (e.g., DMSS) connected to the networks 12 (step S101). The following procedure is then executed in conjunction with all the content management servers 20 included in the obtained list.

The metadata collection unit 301 makes a decision by referencing the list of the content management servers 20 having been obtained as to whether or not there is any DMS yet to be searched (step S103). If it is decided that there is no DMS yet to be searched, the metadata collection unit 301 ends the metadata collection processing. If, on the other hand, it is decided that there is a DMS yet to be searched, the metadata collection unit 301 checks the device description of the DMS yet to be searched and stores the value assumed in the "av:aggregationFlags", which is recorded as a status variable DD_Flags (step S105).

The metadata collection unit 301 then makes a decision with regard to the value of DD_Flags having been ascertained (step S107). If the DD_Flags value is "10", i.e., if the "reference content is managed but no local content is managed in the DMS", the metadata collection unit 301 does not collect any metadata from the DMS (step S109) and instead, makes a decision again as to whether or not there is any DMS yet to be searched.

If, on the other hand, DD_Flags indicates the value "11" or "01" or if it indicates "none", the metadata collection unit 301 starts collecting CDS (step S111). When the DD_Flags value is "11", both reference content and local content are managed in the DMS, whereas when the DD_Flags value is "01", local content alone is managed and no reference content is managed in the DMS. In addition, if DD_Flags indicates "none", the identification flag or any of the various identifiers achieved in the embodiment is not appended in correspondence to the content management server 20 (e.g., a content management server from another manufacturer has been connected) and, accordingly, the CDS must be obtained.

Figure 14:
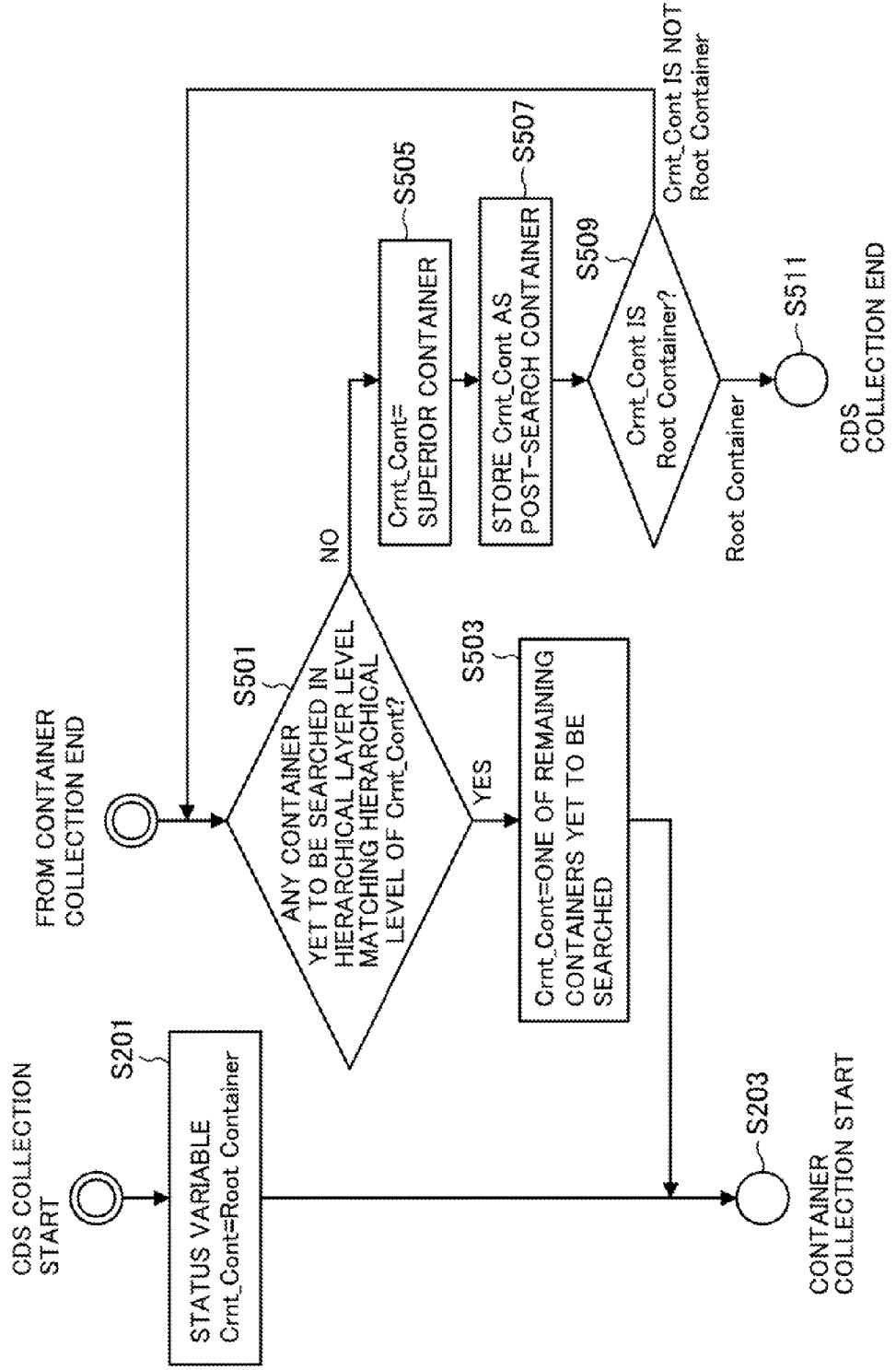
FIG. 14 presents a flowchart of the metadata collection executed in the embodiment.

The CDS collection processing starts by storing the value assumed for a status variable Crnt_Cont, as shown in FIG. 14. This status variable, based upon which an identifier for the currently referenced container is set, is set to the Root container at the start of the CDS collection (step S201). Subsequently, the metadata collection unit 301 starts container collection starting from the Root container set in Crnt_Cont (step S203).

The metadata collection unit 301 undertaking the container collection first verifies the value assumed in DD_Flags in the device description having been stored (step S301). If the DD_Flags value is "11", the metadata collection unit 301 verifies the metadata in the container indicated by Crnt_Cont (step S303). If, on the other hand, the DD_Flags value is "01" or the DD_Flags indicates "none", a decision is made as to whether or not there is any subordinate item unit yet to be searched in the container indicated in Crnt_Cont (step S305).

If the metadata corresponding to the container indicated in Crnt_Cont having been verified in step S303 indicate that the identifier "av:noLocalConents" is appended to the container indicated in Crnt_Cont, the metadata collection unit 301 ascertains the value indicated by the identifier (step S307). If the identifier "av:noLocalConents" assumes the value "1", no local content is present in any of the containers set in lower-order hierarchical layers relative to the hierarchical layer in which the container indicated in Crnt_Cont is located and only reference content is present in the containers in the lower-order hierarchical layers. Accordingly, the metadata collection unit 301 suspends metadata collection (step S309) and ends the container collection (step S311)).

If the identifier "av:noLocalConents" is judged to indicate the value "0" in step S307, local content is present in the containers set in lower-order hierarchical layers relative to the hierarchical layer in which the container indicated in Crnt_Cont is located. Accordingly, a decision is made as to whether or not there is any subordinate item yet to be searched in the container identified in Crnt_Cont (step S305).

If it is decided in step S305 that there is a subordinate item yet to be searched in relation to the container indicated in Crnt_Cont, the metadata collection unit 301 sets a subordinate item yet to be searched for a status variable Crnt_Item indicating the currently referenced item (step S313) and starts item collection (step S315).

If it is decided in step S305 that there is no subordinate item yet to be searched in relation to the container indicated in Crnt_Cont, the metadata collection unit 301 makes a decision as to whether or not there is any subordinate container yet to be searched in relation to the container indicated in Crnt_Cont (step S317). If is decided that there is a subordinate container yet to be searched, the metadata collection unit 301 sets a subordinate container yet to be searched for Crnt_Cont (step S319) and re-executes the flow of container collection (step S321). If, on the other hand, it is decided that there is no subordinate container yet to be searched, the metadata collection unit 301 ends the container collection processing (step S323).

Figure 16:
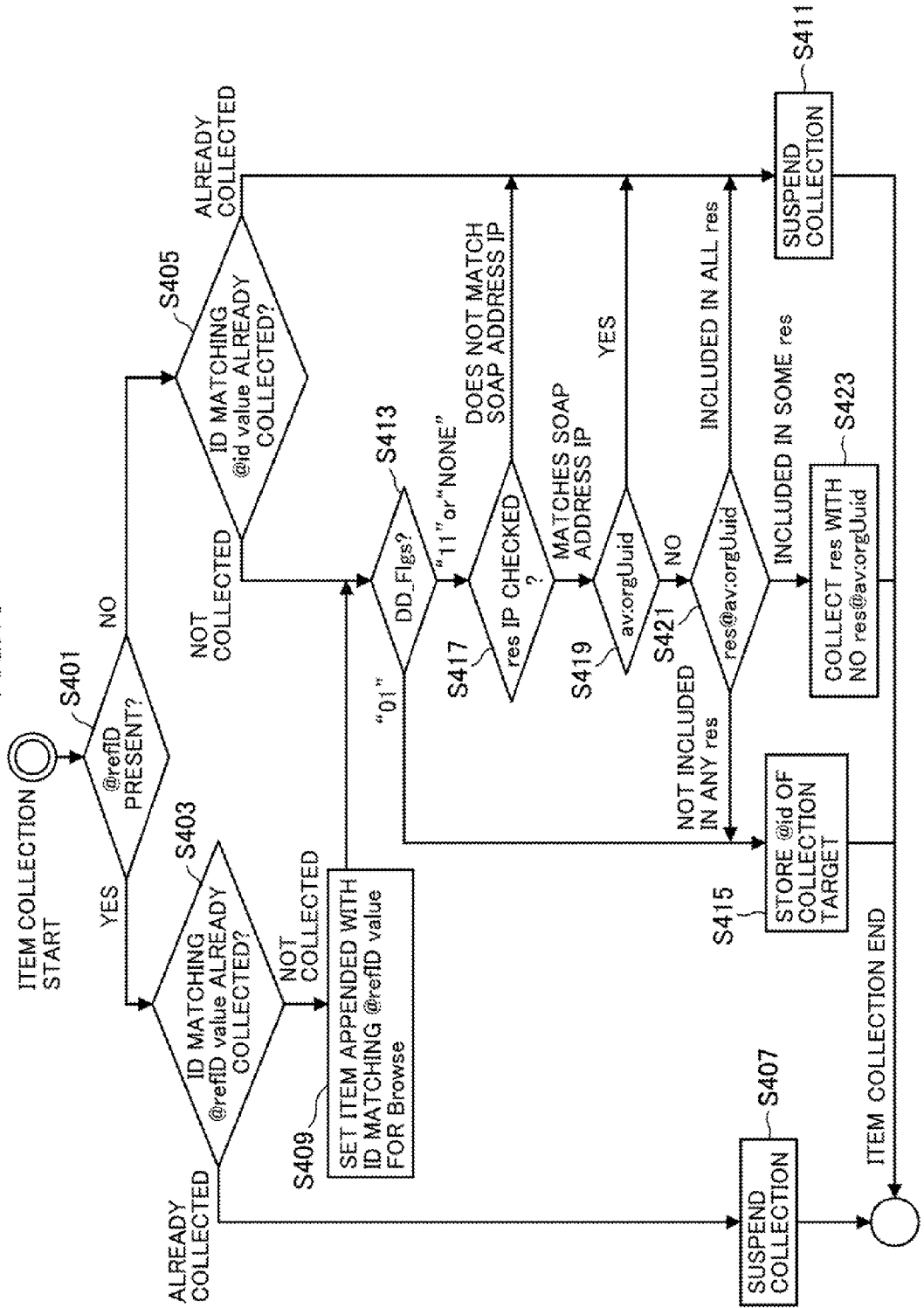
FIG. 16 presents a flowchart of the metadata collection executed in the embodiment.

The item collection processing starts as the metadata collection unit 301 makes a decision (step S401) as to whether or not a reference source ID (refID) is attached to the item, as shown in FIG. 16. If the item is appended with the reference source ID, the metadata collection unit 301 makes a decision as to whether or not the value representing the ID written as the reference source ID (i.e., indicating the item reference source) has already been collected (step S403). In addition, if it is decided in step S401 that the item is not appended with a reference source ID, the metadata collection unit 301 makes a decision as to whether or not the ID (identification ID) written as the item identification ID has already been collected (step S405).

If the metadata collection unit 301 decides in step S403 that the ID written as the reference source ID has already been collected, the item appended with the reference source ID is judged to have been already collected and, accordingly, the metadata collection unit 301 ends the item collection processing without collecting the item (step S407). In addition, if the metadata collection unit 301 decides in step S403 that the ID written as the reference source ID has not been collected, the item appended with the reference source ID is set for "browse" (step S409) and then the processing in step S413 is executed as detailed later.

If the metadata collection unit 301 decides in step S405 that the ID written as the item identification ID has already been collected, the metadata collection unit 301 ends the item collection processing without collecting the item appended with the identification ID (step S411).

If the metadata collection unit 301 decides in step S405 that the ID written as the item identification ID has not been collected or if the item browse instruction is issued in step S409, as described earlier, the metadata collection unit 301 references the value set for DD_Flags (step S413).

If the DD_Flags value is "01", the particular item is obviously local content and, accordingly, the metadata collection unit 301 decides that the item is to be collected and stores the ID appended to the collection target item (step S415) before ending the item collection processing. If, on the other hand, the DD_Flags value is "11" or "none", the item still cannot be confirmed to be local content or reference content and, accordingly, the metadata collection unit 301 executes the following processing.

The metadata collection unit 301 checks the IP address written in the res description location (location at which the item resource-related information is written) corresponding to the currently referenced item (step S417). If the IP address ascertained through the check does not match an IP address in compliance with the SOAP (simple object access protocol), the metadata collection unit 301 judges that this item does not need to be collected (step S411) and ends the item collection processing. If, on the other hand, the IP address ascertained through the check matches a SOAP address IP, the metadata collection unit 301 executes the following processing.

The metadata collection unit 301 references the "av:org-Uuid" identifier appended to the currently referenced item (step S419). The UUID is an identifier used to identify a specific content management server and if a UUID with a value matching the value indicated in this identifier has already been collected, the metadata collection unit 301 does not collect the item assigned with the ID (step S411) and ends the item collection processing. If, on the other hand, there is no UUID matching the "av:orgUuid" identifier, the metadata collection unit 301 executes the following processing.

Namely, the metadata collection unit 301 references the value indicated in the "av:orgUuid" identifier set at the res description location corresponding to the currently referenced item (step S421). If the UUID indicated at the location is included in all the res information, the metadata collection unit 301 judges that this particular item does not need to be collected (step S411) and ends the item collection processing. If, on the other hand, the UUID written at the location is not included in any res information, the metadata collection unit judges that the item is to be collected, stores the ID and ends the item collection processing (step S415). If the UUID written at the location is included in some res information, it collects the res information without the "av:orgUuid" identifier appended in the res description locations thereof (step S423), and then ends the item collection processing.

Figure 15:
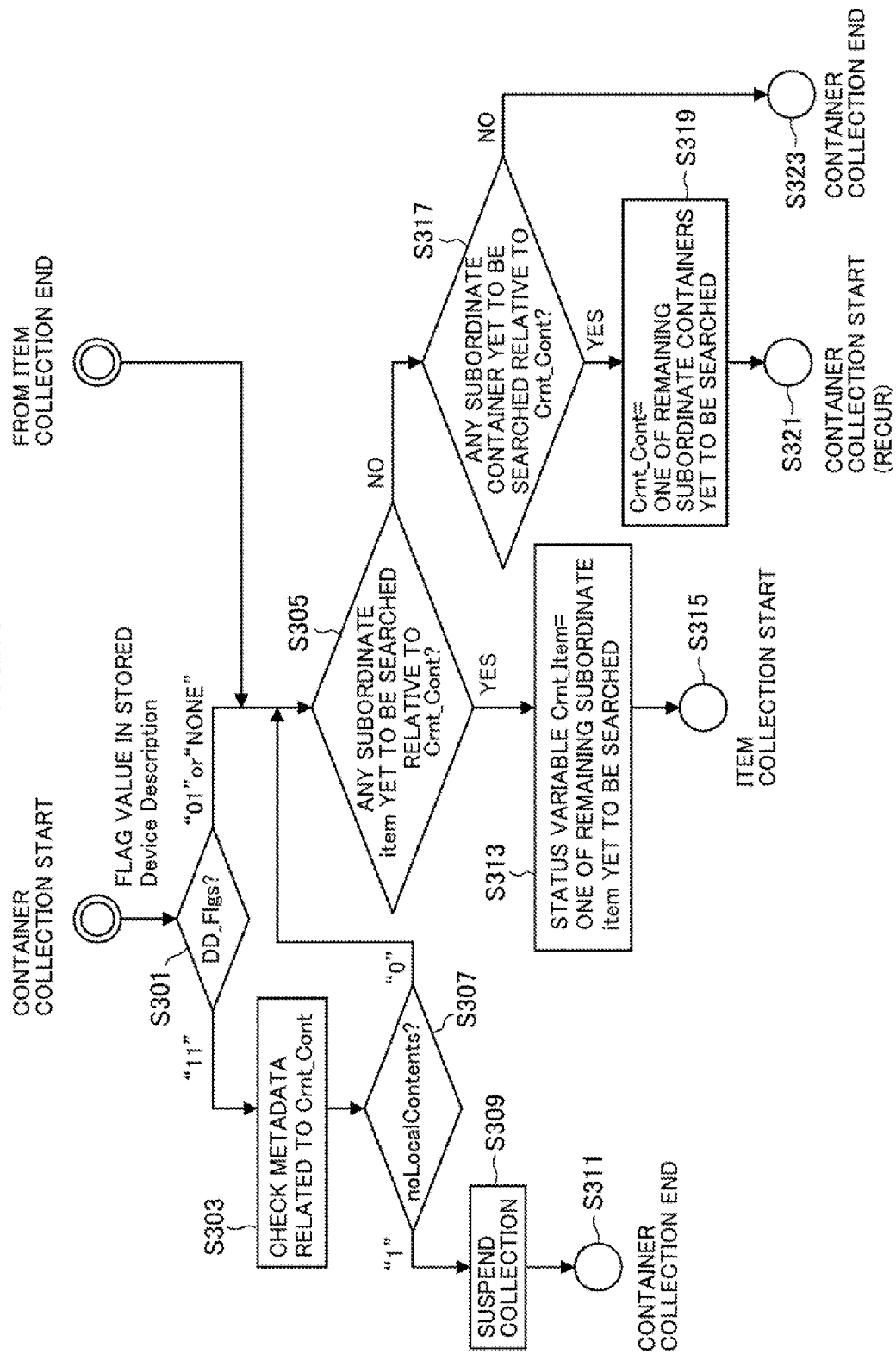
FIG. 15 presents a flowchart of the metadata collection executed in the embodiment.

Once the item collection processing ends, a decision is made as to whether or not the currently referenced container contains any subordinate item yet to be searched (step S305) and if it is decided that there is such a subordinate item, it starts the item collection processing again, as shown in FIG. 15. If, on the other hand, it is decided that there is no subordinate item yet to be searched, a decision is made as to whether or not there is a subordinate container yet to be searched among the subordinate containers of the currently referenced container (step S317), and if it is decided that there is such a subordinate container, the metadata collection unit starts the container collection processing again. If it is decided that there is no subordinate container yet to be searched, the container collection processing ends (step S323).

Upon ending the container collection processing as described above, the metadata collection unit 301 makes a decision as to whether or not there is any container yet to be searched in the same hierarchical level as that of the Crnt_Cont (the currently referenced container) (step S501) as shown in FIG. 14. If it is decided that there is a container yet to be searched, the metadata collection unit 301 sets one of the remaining containers yet to be searched for the Crnt_Cont variable (step S503) and starts executing the container collection processing described above (step S203).

If, on the other hand, it is decided in step S501 that there is no container yet to be searched, the metadata collection unit 301 sets the superior container for the Crnt_Cont variable (step S505) and stores Cmt_Cont as a post-search container (step S507). Next, the metadata collection unit 301 checks the value of the current Crnt_Cont variable and makes a decision as to whether or not the value assumed for the Cmt_Cont variable indicates the [ROOT] container (step S509). If it is decided that the value does not indicate the [ROOT] container, a decision is made again as to whether or not there is any container yet to be searched at the same hierarchical lever as that of the current container Cmt_Cont (step S501). If it is decided that the value indicates the [ROOT] container, the metadata collection unit 301 ends the CDS collection processing (step S511).

Upon ending the CDS collection processing, the metadata collection unit 301 makes a decision as to whether or not there is any DMS yet to be searched (step S103) and if it is decided that there is a DMS yet to be searched, it starts the CDS collection processing again, as shown in FIG. 13. If, on the other hand, it is decided that there is no DMS yet to be searched, it ends the metadata collection processing.

By executing the metadata collection processing as described above, the metadata collection apparatus achieved in the embodiment is able to collect metadata from a plurality of content management servers where content is managed without duplication.

(Item Collection Processing Achieved in First Variation Example)

Figure 17:
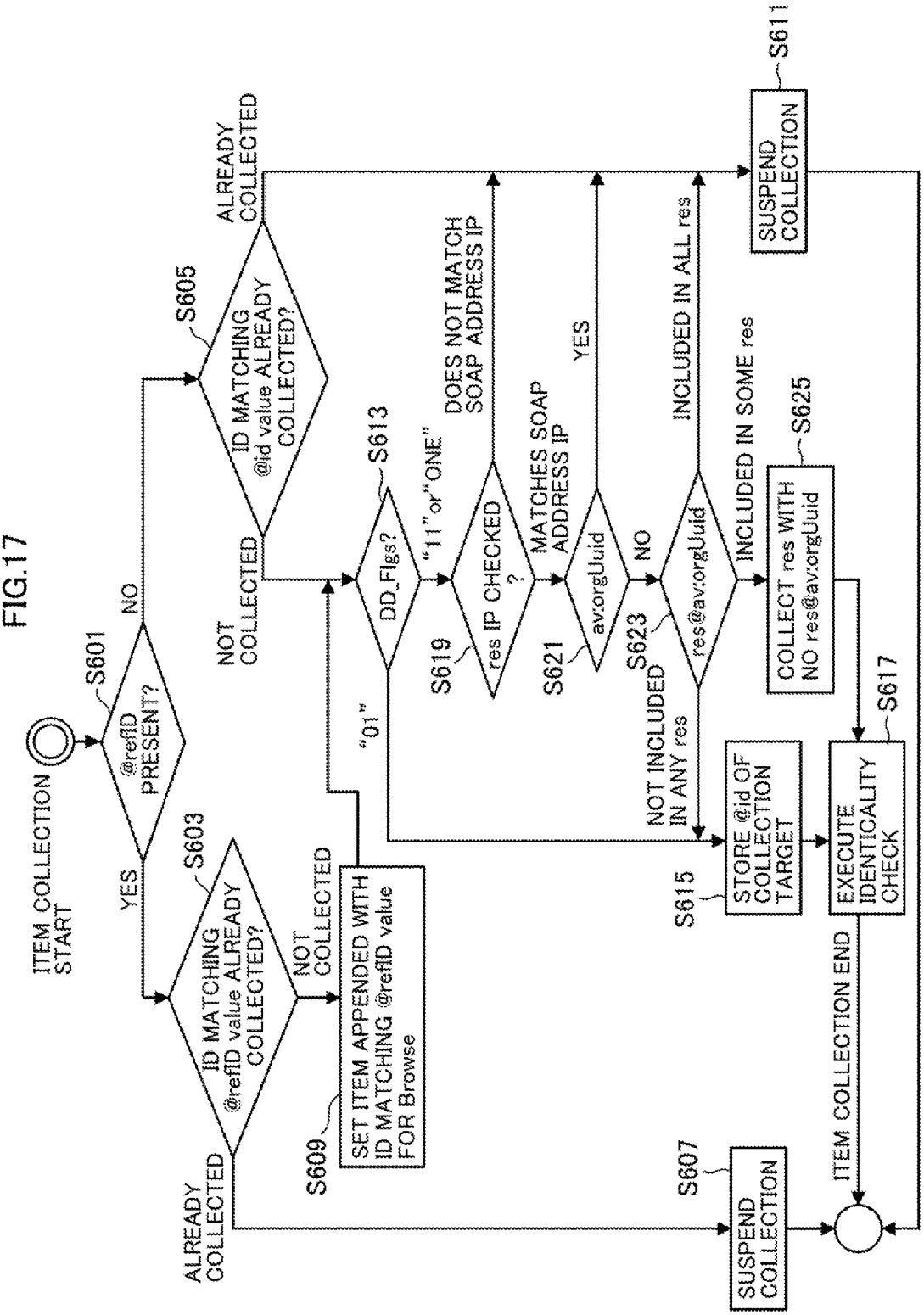
FIG. 17 presents a flowchart of the metadata collection executed in the embodiment.
Figure 18:
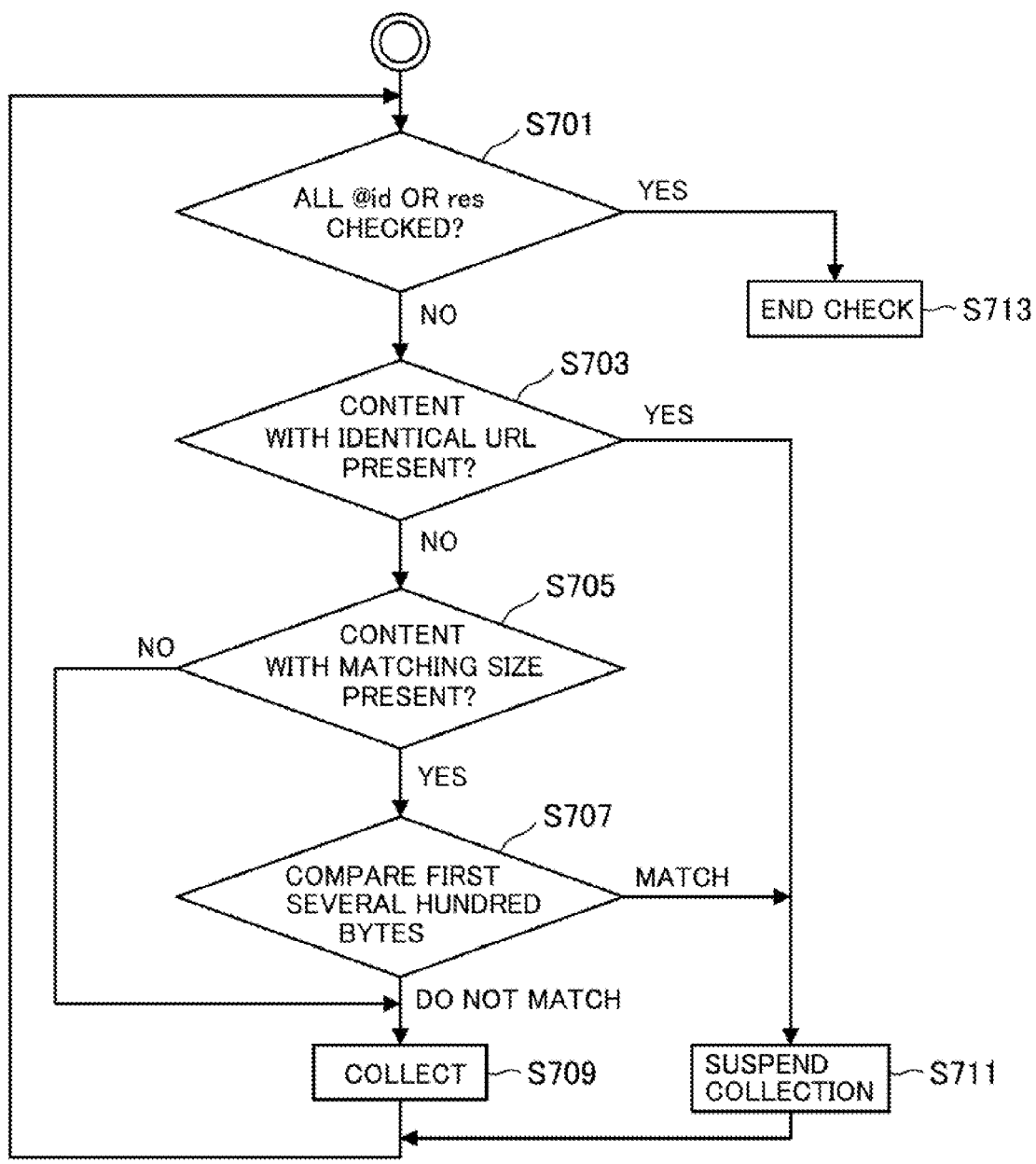
FIG. 18 presents a flowchart of the metadata collection executed in the embodiment.

Next, in reference to FIGS. 17 and 18, the item collection processing achieved in a first variation example is explained in detail. FIGS. 17 and 18 each present a flowchart related to the metadata collection executed in the variation example.

The item collection processing achieved in this variation starts as the metadata collection unit 301 makes a decision (step S601) as to whether or not a reference source ID (refID) is attached to the subject item, as shown in FIG. 17. If the item is appended with the reference source ID, the metadata collection unit 301 makes a decision as to whether or not the value representing the ID written as the reference source ID (i.e., indicating the item reference source) has already been collected (step S603). In addition, if it is decided in step S601 that the item is not appended with a reference source ID, the metadata collection unit 301 makes a decision as to whether or not the ID (identification ID) written as the item identification ID has already been collected (step S605).

If the metadata collection unit 301 decides in step S603 that the ID written as the reference source ID has already been collected, the item appended with the reference source ID is judged to have been already collected and, accordingly, the metadata collection unit 301 ends the item collection processing without collecting the item (step S607). In addition, if the metadata collection unit 301 decides in step S603 that the ID written as the reference source ID has not been collected, the item appended with the reference source ID is set for "browse" (step S609) and then the processing in step S613 is executed as detailed later.

If the metadata collection unit 301 decides in step S605 that the ID written as item identification ID has already been collected, the metadata collection unit 301 ends the item collection processing without collecting the item appended with the identification ID (step S611).

If the metadata collection unit 301 decides in step S605 that the ID written as the item identification ID has not been collected or if the item browse instruction is issued in step S609, as described earlier, the metadata collection unit 301 references the value set for DD_Flags (step S613).

If the DD_Flags value is "01", the particular item is obviously local content and, accordingly, the metadata collection unit 301 decides that the item is to be collected and stores the ID appended to the collection target item (step S615), executes an identicality check to be detailed later (step S617) and subsequently ends the item collection processing upon completing the check. If, on the other hand, the DD_Flags value is "11" or "none", the item still cannot be confirmed to be local content or reference content and, accordingly, the metadata collection unit 301 executes the following processing.

The metadata collection unit 301 checks the IP address written in the res description location (location at which the item resource-related information is written) corresponding to the currently referenced item (step S619). If the IP address ascertained through the check does not match an IP address in compliance with the SOAP (simple object access protocol), the metadata collection unit 301 judges that this item does not need to be collected (step S611) and ends the item collection processing. If, on the other hand, the IP address ascertained through the check matches a SOAP address IP, the metadata collection unit 301 executes the following processing.

The metadata collection unit 301 references the "av:org-Uuid" identifier appended to the currently referenced item (step S621). The UUID is an identifier used to identify a specific content management server and if a UUID with a value matching the value indicated in this identifier has already been collected, the metadata collection unit 301 does not collect the item assigned with the ID (step S611) and ends the item collection processing. If, on the other hand, there is no UUID matching the "av:orgUuid" identifier, the metadata collection unit 301 executes the following processing.

Namely, the metadata collection unit 301 references the value indicated in the "av:orgUuid" identifier set at the res description location corresponding to the currently referenced item (step S623). If the UUID indicated at the location is included in all the res information, the metadata collection unit 301 judges that this particular item does not need to be collected (step S611) and ends the item collection processing. If, on the other hand, the UUID written at the location is not included in any res information, the metadata collection unit judges that the item is to be collected, stores the ID (step S615) and executes the identicality check (step S617) before ending the item collection processing. If the UUID written at the location is included in some res information, it collects the res information without the "av:orgUuid" identifier appended in the res description locations thereof (step S625), executes the identicality check (step S617) and then ends the item collection processing.

Next, in reference to FIG. 18, the identicality check executed in this variation is explained in detail.

First, the metadata collection unit 301 makes a decision as to whether or not all the IDs or res information has been checked (step S701). If it is decided that the check has not been completed, the metadata collection unit 301 makes a decision as to whether or not there is any content with an identical URL by referencing the location information included in the item metadata (step S703). If it is decided that there is content with an identical URL, the metadata collection unit judges that the current collection candidate content does not need to be collected (step S711).

If, on the other hand, it is decided that there is no content with an identical URL, the metadata collection unit 301 compares the data sizes indicated in the item metadata to make a decision as to whether or not there is any content with a matching size (step S705). If it is decided that there is no content in a matching size, the metadata collection unit judges that the current item is to be collected and, accordingly, collects the metadata (step S709).

If, on the other hand, it is decided that there is content in a matching size, the metadata collection unit 301 checks the first several hundred bytes of the content in the item with a matching size to make a decision as to whether or not the item with the matching size is identical to the current item.

If it is decided that the items are not identical to each other based upon the results of the data content comparison, the metadata collection unit 301 collects the metadata (step S709). If, on the other hand, it is decided that the items are identical, the metadata collection unit 301 does not collect the metadata (step S711).

Upon judging whether or not to collect the metadata through the processing described above, the metadata collection unit 301 again makes a decision as to whether or not all the IDs or res information has been checked (step S701), and if it is decided that the check has been completed, it ends the identicality check (step S713).

By further executing the identicality check described above, the likelihood of collecting metadata corresponding to a given set of content in duplication is reduced to an even greater extent.

(Particulars of the Content List)

In reference to FIG. 19, the content list generated by the metadata collection apparatus 30 in the embodiment is briefly explained. FIG. 19 shows an example of a content list that may be generated in the embodiment.

The metadata collection apparatus 30 in the embodiment generates a content list formatted so as to include various types of data such as those shown in FIG. 19 based upon the metadata it has collected from the plurality of content management servers 20. The content list may carry data indicating, for instance, the content title, the medium class, the original title, the server name, the server UUID, the server MAC address and the server status.

The content title data and the original title data indicate the corresponding titles assigned to the subject content. It is to be noted that the server information or the like may be entered as needed by the user of the metadata collection apparatus 34 as the content title. For instance, a content title "Chiaki Cantabile something living room" may be set for a set of content bearing an original tile "Chiaki Cantabile" so as to clearly indicate the location of the server (the living room) that manages the original content in the home network, as shown in FIG. 19.

In addition, in the medium class field, a specific content type is entered so as to clearly indicate that the subject content is video content, music content, photo content or the like.

In order to provide specific information related to the content management server managing the subject content, the content list carries the server name data, the server UUID data, the server MAC address data and the server status data.

The reference source server name data indicate the specific server that manages the subject content to the user of the metadata collection apparatus 30 or a client device 40 and, at the same time, the reference source server name data allow the user to locate the exact server where a problem has occurred in the event of server trouble In addition, the UUID data indicating the UUID of the reference source server make it possible to trace back the server IP address if the IP address of the reference source server is changed.

Moreover, the server information indicating whether or not the power to the reference source server has been turned on and the data indicating the MAC address of the reference source server allow the user to determine with ease whether or not the power to the reference source server has been turned on. If the power to the reference source server has not been turned on, the power to the reference source server can be turned on to obtain various types of information from the reference source server by transmitting a WoL packet to the MAC address of the reference source server. It is to be noted that the data indicates "1" when the power to the server has been turned on and indicates "0" if the power has not been turned on in the example presented in FIG. 19.

The content list generation unit 303 in the metadata collection apparatus 30 creates the content list as described above and then discloses the content list to the client devices 40. The client devices 40 each reference the content list to obtain desired content data with ease and, at the same time, any trouble having occurred in a content management server can be located with ease.

It will be understood by those skilled in the art that various modifications, combinations, sub-combinations and alterations may occur depending upon design requirements and other factors in so far as they are within the scope of the appended claims or equivalents thereof.

For instance, while an explanation has been given in reference to the embodiment on an example in which the metadata collection apparatus has specific functions of collecting metadata and generating and disclosing a content list, these functions of the metadata collection apparatus may be fulfilled in a content management server or a client device.

What is claimed is:

1. A metadata collection system, comprising
a plurality of content management servers, each of the content
management servers
storing content,
managing the content and first metadata including location information and attribute information related to said content as local content, and
managing second content metadata stored in another content management server as reference content, and
a metadata collection apparatus that is connected to said plurality of content management servers and collects said first and second metadata from said plurality of content management servers, wherein:
one of said content management servers comprises:
a storage unit storing server information indicating whether or not a piece of content is managed by said content management server and said local content and/or said reference content;
a tree structure generation unit that generates a tree structure comprising a plurality of hierarchically layered containers;
a content allocation unit that allocates said local content and/or said reference content to specific containers in said tree structure based upon said attribute information;
an identifier appending unit that appends a category identifier to each of said plurality of containers based upon said location information, the category identifier indicating whether or not said local content is allocated to a subject container; and
a content disclosure unit that discloses to said metadata collection apparatus said tree structure with category identifiers and said local content and/or said reference content allocated therein; and
said metadata collection apparatus collects said metadata related to a plurality of sets of content from the content management servers and conducts a check to determine whether there are identical metadata among the metadata collected from said content management servers.

2. A content management server
communicating with a metadata collection apparatus and a client device,
managing content stored in the content management server and first metadata including location information and attribute information related to said content as local content, and
managing second content metadata managed by another content management server as reference content,
the content management server comprising:
a storage unit storing server information and said local content and/or said reference content;
a tree structure generation unit that generates a tree structure comprising a plurality of hierarchically layered containers;
a content allocation unit that allocates said local content and/or said reference content to specific containers in said tree structure based upon said attribute information;
an identifier appending unit that appends a category identifier to each of said plurality of containers based upon said location information, the category identifier indicating whether or not said local content is allocated to a subject container; and
a content disclosure unit that discloses to said metadata collection apparatus said tree structure with category identifiers and said local content and/or said reference content allocated therein,
wherein the server information contains an identification flag indicating whether a container contains said local content.

3. The content management server according to claim 2, wherein:
said flag is
a flag indicating that said local content alone is managed,
a flag indicating that said reference content alone is managed, or
a flag indicating that both said local content and said reference content are managed.

4. The content management server according to claim 2, wherein:
said identifier appending unit further appends to a container a classification identifier indicating a classification of another container or a classification of content allocated to a lower-order hierarchical layer relative to the hierarchical layer to which said container belongs in said tree structure.

5. The content management server according to claim 4, wherein:
said content allocation unit allocates a single set of content to a plurality of containers in said tree structure.

6. The content management server according to claim 2, wherein:
the number of hierarchical layers constituting said tree structure is 10 or fewer.

7. A metadata collection apparatus communicating with a plurality of content management servers, each of the content management servers
managing content and first metadata including location information and attribute information related to said content as local content,
managing second content metadata managed by another content management server as reference content, and
holding server information comprising an identification flag indicating a category of said content managed therein,
the metadata collection apparatus comprising:
a metadata collection unit that
collects said metadata related to a plurality of sets of content from the content management servers based upon said server information held at each content management server and category identifiers each indicating whether or not said local content is allocated to a subject container, the category identifiers being appended to a plurality of containers constituting a tree structure having been generated by one of said content management servers; and executes an identicality check to determine whether there are identical metadata among the metadata collected from said content management servers.

8. The metadata collection apparatus according to claim 7, wherein:

said flag is a flag indicating that said local content alone is managed, a flag indicating that said reference content alone is managed, or a flag indicating that both said local content and said reference content are managed; and said metadata collection unit collects said metadata from a content management server if said content identification flag either indicates that said local content alone is managed or that both said local content and said reference content are managed.

9. The metadata collection apparatus according to claim 7, wherein:

only when a container is appended with a category identifier indicating that said local content is stored therein, said metadata collection unit references a lower-order hierarchical layer relative to a hierarchical layer in which the container appended with said category identifier is set.

10. The metadata collection apparatus according to claim 7, wherein:

said metadata include ID information based upon which said content corresponding to said metadata is identified; and said metadata collection unit executes said identicality check by comparing the ID information included in said collected metadata.

11. The metadata collection apparatus according to claim 7, wherein:

said metadata collection unit executes said identicality check by comparing said location information included in said collected metadata.

12. The metadata collection apparatus according to claim 7, wherein:

said metadata include data size information indicating the data size of said content corresponding to said metadata; and said metadata collection unit executes said identicality check by comparing the data size information included in said collected metadata.

13. The metadata collection apparatus according to claim 7, wherein a content list comprises location information for a specific set of content.

14. The metadata collection apparatus according to claim 13, further comprising:

a content list disclosure unit that discloses said content list to a client device connected to said metadata collection apparatus.

15. A metadata collection method comprising:

collecting, from a plurality of content management servers, content metadata managed by said plurality of content management servers, each of the content management servers managing content and first metadata including location information and attribute information corresponding to said content as local content and managing second content metadata managed by another content management server as reference content and holding server information comprising an identification flag indicating a category of content managed therein;

collecting said metadata related to a plurality of sets of content from content management servers based upon said server information held at each content management server and category identifiers each indicating whether or not said local content is allocated to a subject container, the category identifiers being appended to a plurality of containers constituting a tree structure generated by said content management servers, and conducting a check to determine whether there are identical metadata among the metadata collected from said content management servers.

16. A tangible computer readable storage medium tangibly storing a program causing a computer to control a content management server communicating with a metadata collection apparatus and a client device, managing content and first metadata including location information and attribute information related to said content as local content, and managing second content metadata managed by another content management server as reference content, the computer controlling the content management server to perform:

a storage function of storing server information containing an identification flag indicating a category of content managed by said content management server and said local content and/or said reference content;

a tree structure generation function of generating a tree structure comprising a plurality of hierarchically layered containers;

a content allocation function of allocating said local content and/or said reference content to the containers based upon said attribute information included in the metadata;

an identifier appending function of appending a category identifier to each of said plurality of containers based upon said location information, the category identifier indicating whether or not said local content is allocated to a subject container; and a content disclosure function of disclosing to said metadata collection apparatus said tree structure allocated with category identifiers and said local content and/or said reference content.

17. A tangible computer readable storage medium tangibly storing a program causing a computer to control a metadata collection apparatus communicating with a plurality of content management servers, each of the content management servers managing content and first metadata including location information and attribute information related to said content as local content, managing second content metadata managed by another content management server as reference content, and holding server information comprising an identification flag indicating a category of said content managed therein, the computer controlling the metadata collection apparatus to perform:

a metadata collection function of collecting said metadata related to a plurality of sets of content from the content management servers based upon said server information held at each content management server and category identifiers each indicating whether or not said local content is allocated to a subject container, the category identifiers being appended to a plurality of containers constituting a tree structure generated by one of said content management servers, by individually referencing a plurality of content management servers connected with said metadata collection apparatus, and an identicality check function of checking whether there are identical metadata among the metadata collected from said content management servers.

* * * * *